(12) United States Patent
Matsukawa

(10) Patent No.: US 10,731,985 B2
(45) Date of Patent: Aug. 4, 2020

(54) SENSOR ELEMENT CONTROL DEVICE, PHYSICAL QUANTITY SENSOR, ELECTRONIC DEVICE, AND FAULT DIAGNOSIS METHOD OF VEHICLE AND PHYSICAL QUANTITY SENSOR

(71) Applicant: Seiko Epson Corporation, Tokyo (JP)

(72) Inventor: Norihito Matsukawa, Suwa (JP)

(73) Assignee: Seiko Epson Corporation (JP)

( * ) Notice: Subject to any disclaimer, the term of this patent is extended or adjusted under 35 U.S.C. 154(b) by 198 days.

(21) Appl. No.: 15/924,793

(22) Filed: Mar. 19, 2018

(65) Prior Publication Data
US 2018/0274921 A1 Sep. 27, 2018

(30) Foreign Application Priority Data

Mar. 23, 2017 (JP) ................................ 2017-057137

(51) Int. Cl.
| | |
|---|---|
| *G01C 19/5607* | (2012.01) |
| *G01C 19/5614* | (2012.01) |
| *G01C 19/5776* | (2012.01) |

(52) U.S. Cl.
CPC ..... *G01C 19/5607* (2013.01); *G01C 19/5614* (2013.01); *G01C 19/5776* (2013.01)

(58) Field of Classification Search
CPC ............ G01C 19/5614; G01C 19/5712; G01C 19/5677; G01C 16/5776; G01C 19/5616; G01C 16/5747
See application file for complete search history.

(56) References Cited

U.S. PATENT DOCUMENTS

| | | | |
|---|---|---|---|
| 5,969,225 A | 10/1999 | Kobayashi | |
| 2005/0091006 A1* | 4/2005 | Rober | G01C 19/56 702/189 |
| 2010/0011834 A1 | 1/2010 | Sato | |
| 2010/0280794 A1* | 11/2010 | Uemura | G01C 19/56 702/183 |

(Continued)

FOREIGN PATENT DOCUMENTS

| | | |
|---|---|---|
| JP | 3603501 B2 | 12/2004 |
| JP | 2010-043962 * | 2/2010 |

(Continued)

OTHER PUBLICATIONS

Translation of JP2010-043962.*

*Primary Examiner* — Helen C Kwok
(74) *Attorney, Agent, or Firm* — Harness, Dickey & Pierce, P.L.C.

(57) ABSTRACT

A sensor element control device which is connectable to a sensor element including a drive unit and a detection unit, includes a drive circuit that outputs a drive signal to the drive unit; a detection circuit that generates a detection signal based on a signal output from the detection unit; a diagnostic signal generation circuit that generates a diagnostic signal having a frequency component corresponding to a detuning frequency which is a difference frequency between a drive frequency which is a frequency at which the drive unit vibrates and a detection frequency which is a frequency at which the detection unit vibrates; and a fault diagnosis circuit that performs fault diagnosis based on a signal output from the detection unit when the diagnostic signal is superimposed on the drive signal.

20 Claims, 12 Drawing Sheets

(56) References Cited

U.S. PATENT DOCUMENTS

| | | | | |
|---|---|---|---|---|
| 2011/0100126 A1* | 5/2011 | Jeong | ............... | G01C 19/5719 |
| | | | | 73/514.32 |
| 2012/0055230 A1* | 3/2012 | Naruse | ............... | G01C 19/5726 |
| | | | | 73/1.37 |
| 2013/0133422 A1* | 5/2013 | Yamanaka | ......... | G01C 19/5747 |
| | | | | 73/504.03 |
| 2016/0271649 A1* | 9/2016 | Sato | ............... | B06B 1/0246 |
| 2016/0337158 A1* | 11/2016 | Watanabe | ............... | H04L 27/14 |
| 2018/0041217 A1* | 2/2018 | Murakami | ......... | G01C 19/5614 |
| 2019/0094284 A1* | 3/2019 | Takada | ............... | G01R 31/025 |

FOREIGN PATENT DOCUMENTS

| | | | |
|---|---|---|---|
| JP | 4843855 | B2 | 12/2011 |
| JP | 5360361 | B2 | 12/2013 |
| JP | 5365770 | B2 | 12/2013 |

\* cited by examiner

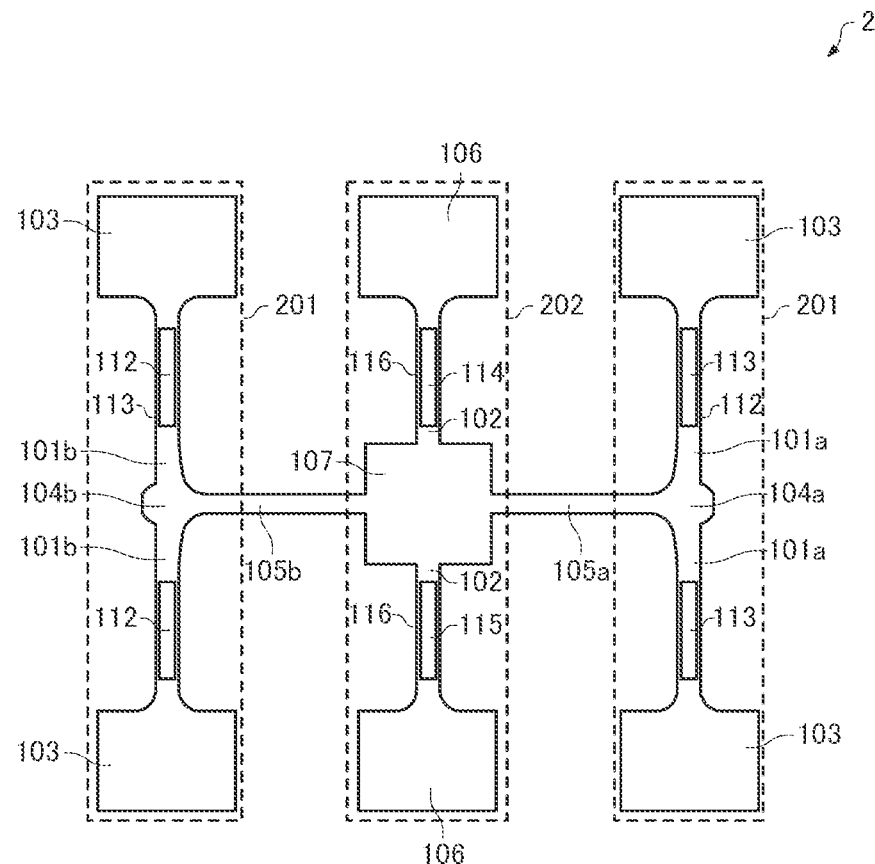
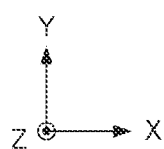
FIG. 2

SENSOR ELEMENT CONTROL DEVICE, PHYSICAL QUANTITY SENSOR, ELECTRONIC DEVICE, AND FAULT DIAGNOSIS METHOD OF VEHICLE AND PHYSICAL QUANTITY SENSOR

BACKGROUND

1. Technical Field

The present invention relates to a sensor element control device, a physical quantity sensor, an electronic device, and a fault diagnosis method of a vehicle and a physical quantity sensor.

2. Related Art

Currently, in various systems and electronic devices, various physical quantity sensors capable of detecting various physical quantities, such as an acceleration sensor detecting an acceleration and a gyro sensor detecting an angular velocity are widely used. Since erroneous control is performed when the physical quantity sensor fails in the system and the electronic device using the physical quantity sensor, the physical quantity sensor is required to have a function of diagnosing its own fault and outputting the result of the fault diagnosis. For example, Japanese Patent No. 5365770 discloses an angular velocity detection device that generates an angular velocity pseudo signal at the time of fault diagnosis mode, supplies the generated angular velocity pseudo signal to the drive electrode of a vibrator by superimposing the generated angular velocity pseudo signal on the drive signal, and performs fault diagnosis based on an amplitude difference between a signal propagated to a first detection electrode and the angular velocity pseudo signal propagated to the second detection electrode through a second electrostatic coupling capacitor.

However, in the angular velocity detection device disclosed in Japanese Patent No. 5365770, since it is necessary to intentionally generate a difference between the electrostatic coupling capacitance between the drive electrode and the first detection electrode and the electrostatic coupling capacitance between the drive electrode and the second detection electrode, when the drive amplitude level changes due to a temperature change or a change over time, the detection level of the angular velocity changes due to the electrostatic coupling capacitance difference, and there is a possibility that it affects the detection accuracy of angular velocity.

SUMMARY

An advantage of some aspects of the invention is to provide a sensor element control device and a physical quantity sensor capable of performing fault diagnosis while reducing the influence on the detection accuracy of a physical quantity even when the drive amplitude level changes. Another advantage of some aspects of the invention is to provide an electronic device and a vehicle using a physical quantity sensor.

The invention can be implemented as the following forms or application example.

Application Example 1

A sensor element control device according to this application example is a sensor element control device connectable to a sensor element including a drive unit and a detection unit, and includes a drive circuit that outputs a drive signal to the drive unit; a detection circuit that generates a detection signal based on a signal output from the detection unit; a diagnostic signal generation circuit that generates a diagnostic signal having a frequency component corresponding to a detuning frequency which is a difference frequency between a drive frequency which is a frequency at which the drive unit vibrates and a detection frequency which is a frequency at which the detection unit vibrates; and a fault diagnosis circuit that performs fault diagnosis based on a signal output from the detection unit when the diagnostic signal is superimposed on the drive signal.

The drive frequency is an arbitrary frequency included in a frequency range in which the drive unit vibrates, and the detection frequency is an arbitrary frequency included in a frequency range in which the detection unit vibrates. Therefore, the detuning frequency is not limited to the difference frequency between the frequency at which the amplitude of the drive unit is maximum (the resonance frequency of the drive unit) and the frequency at which the amplitude of the detection unit is maximum (the resonance frequency of the detection unit).

According to the sensor element control device according to this application example, since a drive signal on which a diagnostic signal having a detuning frequency is superimposed is output to the drive unit of the sensor element, the detection unit of the sensor element is excited, and therefore it is possible to diagnose a fault such as a disconnection with the sensor element or a defect of the sensor element, based on the signal output from the detection unit. According to the sensor element control device of the application example, fault diagnosis is performed without using the electrostatic coupling capacitance difference between the drive electrode of the sensor element and the two detection electrodes, so that the electrostatic coupling capacitance difference may be reduced, and even if the drive amplitude level changes, the influence on the detection accuracy of the physical quantity can be reduced.

Application Example 2

In the sensor element control device according to the application example, an amplitude of the drive signal when the diagnostic signal is superimposed may change at the detuning frequency. In other words, when the diagnostic signal is superimposed on the drive signal, the superimposed drive signal may include an amplitude-modulated drive signal which is amplitude modulated with the detuning frequency.

According to the sensor element control device according to this application example, it is possible to excite the detection unit while stably oscillating the drive unit of the sensor element, by keeping the frequency of the drive signal constant, so that fault diagnosis can be performed with high accuracy.

Application Example 3

In the sensor element control device according to the application example, the amplitude of the diagnostic signal may be variable.

For example, the amplitude of the diagnostic signal may differ depending on the fault diagnosis at activation and the subsequent fault diagnosis, or the amplitude of the diagnostic signal may change according to the change in the state of the sensor element.

According to the sensor element control device according to this application example, fault diagnosis can be performed with high accuracy by setting the diagnostic signal to an appropriate amplitude.

Application Example 4

In the sensor element control device according to the application example, the diagnostic signal generation circuit may change the amplitude of the diagnostic signal, based on an amplitude of a signal output from the drive unit.

According to the sensor element control device according to this application example, even if the driving amplitude level changes, fault diagnosis can be performed with high accuracy, by appropriately changing the amplitude of the diagnostic signal according to the change in the drive amplitude level caused by a temperature characteristic and a change over time of the sensor element.

Application Example 5

In the sensor element control device according to the application example, the detection circuit may include a synchronous detection circuit that performs synchronous detection on the signal output from the detection unit, and the fault diagnosis circuit may perform the fault diagnosis on an output signal of the synchronous detection circuit, based on a signal subjected to a bandpass filtering process in which the detuning frequency is included in a passband.

According to the sensor element control device according to this application example, since the signal of the frequency not included in the passband including the detuning frequency is attenuated by the bandpass filtering process, fault diagnosis can be performed with high accuracy. According to the sensor element control device according to the application example, for example, generation of a detection signal corresponding to the physical quantity detected by the sensor element and fault diagnosis can be performed at the same time.

Application Example 6

The sensor element control device according to the application example may further include a storage unit that stores information on the detuning frequency.

According to the sensor element control device according to this application example, fault diagnosis can be performed with high accuracy, by setting in the storage unit, an appropriate detuning frequency according to the characteristics of the connected sensor element (the difference between the resonance frequency of the drive unit and the resonance frequency of the detection unit).

Application Example 7

In the sensor element control device according to the application example, the fault diagnosis circuit may perform the fault diagnosis when the sensor element control device is activated.

According to the sensor element control device according to this application example, in a case where a fault occurs while the sensor element control device is stopped, it is possible to detect a fault immediately after activation.

Application Example 8

In the sensor element control device according to the application example, the fault diagnosis circuit may further perform the fault diagnosis at a predetermined timing after activation of the sensor element control device.

According to the sensor element control device according to this application example, it is possible to detect a fault occurring after activation of the sensor element control device.

Application Example 9

In the sensor element control device according to the application example, the fault diagnosis circuit may change a threshold for the fault diagnosis, based on the amplitude of the signal output from the drive unit.

According to the sensor element control device according to this application example, even if the drive amplitude level changes, fault diagnosis can be performed with high accuracy, by appropriately changing the threshold for fault diagnosis according to the change in the drive amplitude level caused by the temperature characteristic and the change over time of the sensor element.

Application Example 10

In the sensor element control device according to the application example, the diagnostic signal generation circuit may generate a plurality of the diagnostic signals having a frequency components corresponding to detuning frequencies which are different from each other, and the fault diagnosis circuit may perform the fault diagnosis based on a signal output from the detection unit when each of the plurality of diagnostic signals is superimposed on the drive signal.

According to the sensor element control device according to this application example, in a case where the difference between the resonance frequency of the drive unit and the resonance frequency of the detection unit change due to a defect of the sensor element or the like, the level of the signal output from the detection unit greatly changes when any diagnostic signal is superimposed on the drive signal, so that the accuracy of fault diagnosis can be improved.

Application Example 11

A physical quantity sensor according to this application example includes the sensor element control device according to any one of the application examples and a sensor element.

According to the physical quantity sensor according to this application example, since a drive signal on which a diagnostic signal having a detuning frequency is superimposed is output from the sensor element control device to the drive unit of the sensor element, the detection unit of the sensor element is excited, and therefore the sensor element control device can diagnose a fault such as a disconnection with the sensor element or a defect of the sensor element, based on the signal output from the detection unit. According to the physical quantity sensor according to this application example, since the sensor element control device performs fault diagnosis without using the electrostatic coupling capacitance difference between the drive electrode of the sensor element and the two detection electrodes, the electrostatic coupling capacitance difference may be reduced, and even if the drive amplitude level changes, the influence on the detection accuracy of the physical quantity can be reduced.

Application Example 12

In the physical quantity sensor according to the application example, the drive unit of the sensor element may be driven to vibrate by the drive signal, and the detection unit of the sensor element may output a signal based on a change in the physical quantity.

According to the physical quantity sensor according to this application example, it is possible to diagnose a fault of a sensor element configured using a vibrator.

Application Example 13

In the physical quantity sensor according to the application example, the sensor element may further include a plurality of connecting arms connecting the detection unit and the drive unit, the detection unit may include a detection base portion and a plurality of detection vibrating arms extending from the detection base portion, and the drive unit may include a plurality of driving base portions connected to the detection base portion by each of the plurality of connecting arms and a plurality of driving vibrating arms extending from each of the plurality of driving base portions.

According to the physical quantity sensor according to this application example, it is possible to diagnose a fault of a double T-type sensor element.

Application Example 14

An electronic device according to this application example includes the physical quantity sensor according to any one of the application examples.

Application Example 15

A vehicle according to this application example includes the physical quantity sensor according to any one of the application examples.

According to these application examples, since the electronic device and the vehicle include the physical quantity sensor capable of performing fault diagnosis while reducing the influence on the detection accuracy of the physical quantity even if the driving amplitude level changes, for example, it is also possible to realize a highly reliable electronic device and a vehicle.

Application Example 16

A fault diagnosis method of a physical quantity sensor according to this application example is a fault diagnosis method for diagnosing a fault of a physical quantity sensor including a sensor element including a drive unit and a detection unit and a sensor element control device controlling the sensor element, and includes generating a diagnostic signal having a frequency components corresponding to a detuning frequency which is a difference frequency between a drive frequency which is a frequency at which the drive unit vibrates and a detection frequency which is a frequency at which the detection unit vibrates; superimposing the diagnostic signal on a drive signal and outputting it to the drive unit; and performing fault diagnosis of the physical quantity sensor, based on a signal output from the detection unit.

According to the fault diagnosis method of the physical quantity sensor according to this application example, since a drive signal on which a diagnostic signal having a detuning frequency is superimposed is output to the drive unit of the sensor element, the detection unit of the sensor element is excited, and therefore it is possible to diagnose a fault such as a disconnection with the sensor element or a defect of the sensor element, based on the signal output from the detection unit. According to the fault diagnosis method of the physical quantity sensor according to this application example, fault diagnosis is performed without using the electrostatic coupling capacitance difference between the drive electrode of the sensor element and the two detection electrodes, so that the electrostatic coupling capacitance difference may be reduced, and even if the drive amplitude level changes, the influence on the detection accuracy of the physical quantity can be reduced.

BRIEF DESCRIPTION OF THE DRAWINGS

The invention will be described with reference to the accompanying drawings, wherein like numbers reference like elements.

FIG. 2 is a plan view of a vibration element of a physical quantity detection element.

DESCRIPTION OF EXEMPLARY EMBODIMENTS

Hereinafter, preferred embodiments of the invention will be described in detail with reference to the drawings. In addition, the embodiments to be described below do not unfairly limit the contents of the invention described in the appended claims. Further, not all of the configurations described below are necessarily essential constituent elements of the invention.

A physical quantity sensor (angular velocity sensor) which detects an angular velocity as a physical quantity will be described as an example below.

1. Physical Quantity Sensor 1-1. First Embodiment

Figure 1:
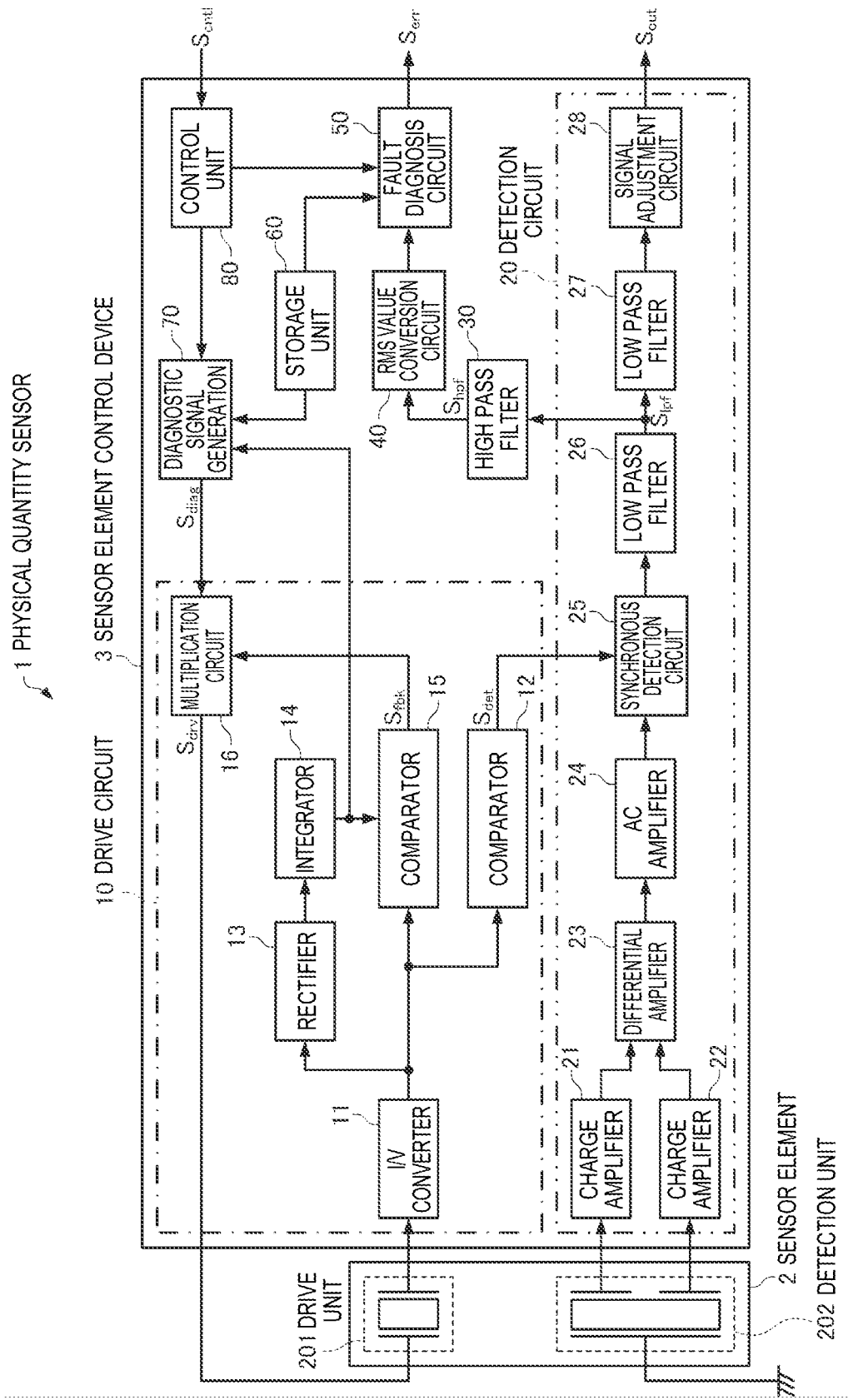
FIG. 1 is a functional block diagram of a physical quantity sensor according to the present embodiment.

FIG. 1 is a functional block diagram of a physical quantity sensor according to the present embodiment. As illustrated in FIG. 1, the physical quantity sensor 1 of the present embodiment includes a sensor element 2 that outputs an analog signal related to a physical quantity, and a sensor element control device 3 connectable to the sensor element 2.

The sensor element 2 includes a drive unit 201 which is driven to vibrate by a drive signal $S_{drv}$ and a detection unit 202 that outputs a signal based on a change in a physical quantity (angular velocity). The sensor element 2 includes a vibration element having a drive electrode and a detection electrode arranged therein, and in general, the vibration element is sealed in a package whose airtightness is secured, in order to improve the oscillation efficiency by making the impedance of the vibration element as small as possible. In the present embodiment, the sensor element 2 has a so-called double T-type vibration element having two T-type driving vibrating arms.

FIG. 2 is a plan view of the vibration element of the sensor element 2. The sensor element 2 has, for example, a double T-type vibration element formed by a Z-cut quartz crystal substrate. The vibration element made of quartz crystal ($SiO_2$) has an advantage that the detection accuracy of angular velocity can be improved because the variation of the resonance frequency with respect to a temperature change is extremely small. The X axis, the Y axis, and the Z axis in FIG. 2 indicate axes of quartz crystal.

As illustrated in FIG. 2, the sensor element 2 includes a drive unit 201, a detection unit 202, and a plurality of connecting arms 105a and 105b connecting the detection unit 202 and the drive unit 201. The detection unit 202 includes a detection base portion 107 and a plurality of detection vibrating arms 102 extending from the detection base portion 107. Further, the drive unit 201 includes a plurality of driving base portions 104a and 104b connected to the detection base portion 107 by each of the plurality of connecting arms 105a and 105b, and a plurality of driving vibrating arms 101a and 101b extending from each of the plurality of driving base portions 104a and 104b (a plurality of driving vibrating arms 101a extending from the driving base portion 104a and a plurality of driving vibrating arms 101b extending from the driving base portion 104b).

More specifically, in the vibration element of the sensor element 2, the driving vibrating arms 101a and 101b extend from the two driving base portions 104a and 104b in +Y-axis direction and −Y-axis direction, respectively. Drive electrodes 112 and 113 are formed on the side and upper surfaces of the driving vibrating arm 101a, respectively, and drive electrodes 113 and 112 are formed on the side and upper surfaces of the driving vibrating arm 101b. The drive electrodes 112 and 113 are connected to the drive circuit 10 through the DS terminal and the DG terminal of the sensor element control device 3 illustrated in FIG. 1, respectively.

The driving base portions 104a and 104b are connected to a rectangular detection base portion 107 through connecting arms 105a and 105b extending in the −X-axis direction and the +X-axis direction, respectively.

The detection vibrating arm 102 extends from the detection base portion 107 in +Y-axis direction and −Y-axis direction. Detection electrodes 114 and 115 are formed on the upper surface of the detection vibrating arm 102, and a common electrode 116 is formed on a side surface of the detection vibrating arm 102. The detection electrodes 114 and 115 are connected to the detection circuit 20 through the S1 terminal and the S2 terminal of the sensor element control device 3 illustrated in FIG. 1, respectively. Further, the common electrode 116 is grounded.

Figure 3:
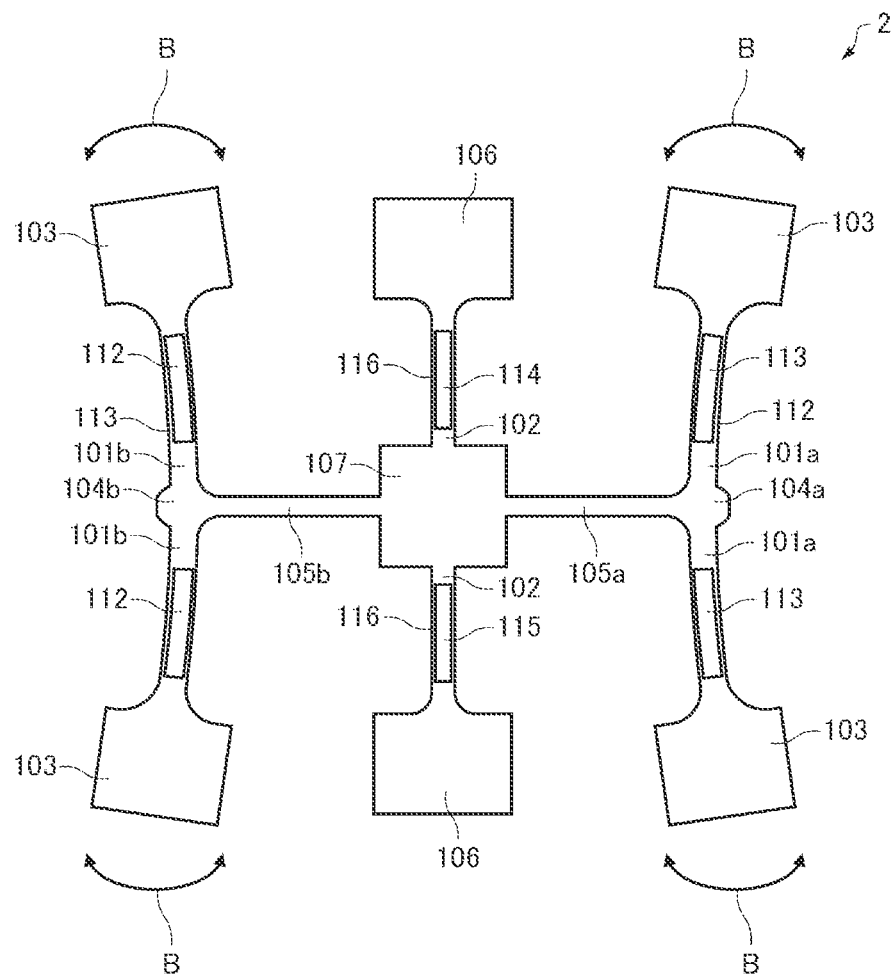
FIG. 3 is a diagram for explaining an operation of the physical quantity detection element.

When an alternating voltage is applied as a drive signal to between the drive electrode 112 and the drive electrode 113 of the driving vibrating arms 101a and 101b, as illustrated in FIG. 3, the driving vibrating arms 101a and 101b perform flexural vibration (excitation vibration) in which the tips of the two driving vibrating arms 101a and 101b repeat approaching and separating from each other, as illustrated by the arrow B by the inverse piezoelectric effect.

Figure 4:
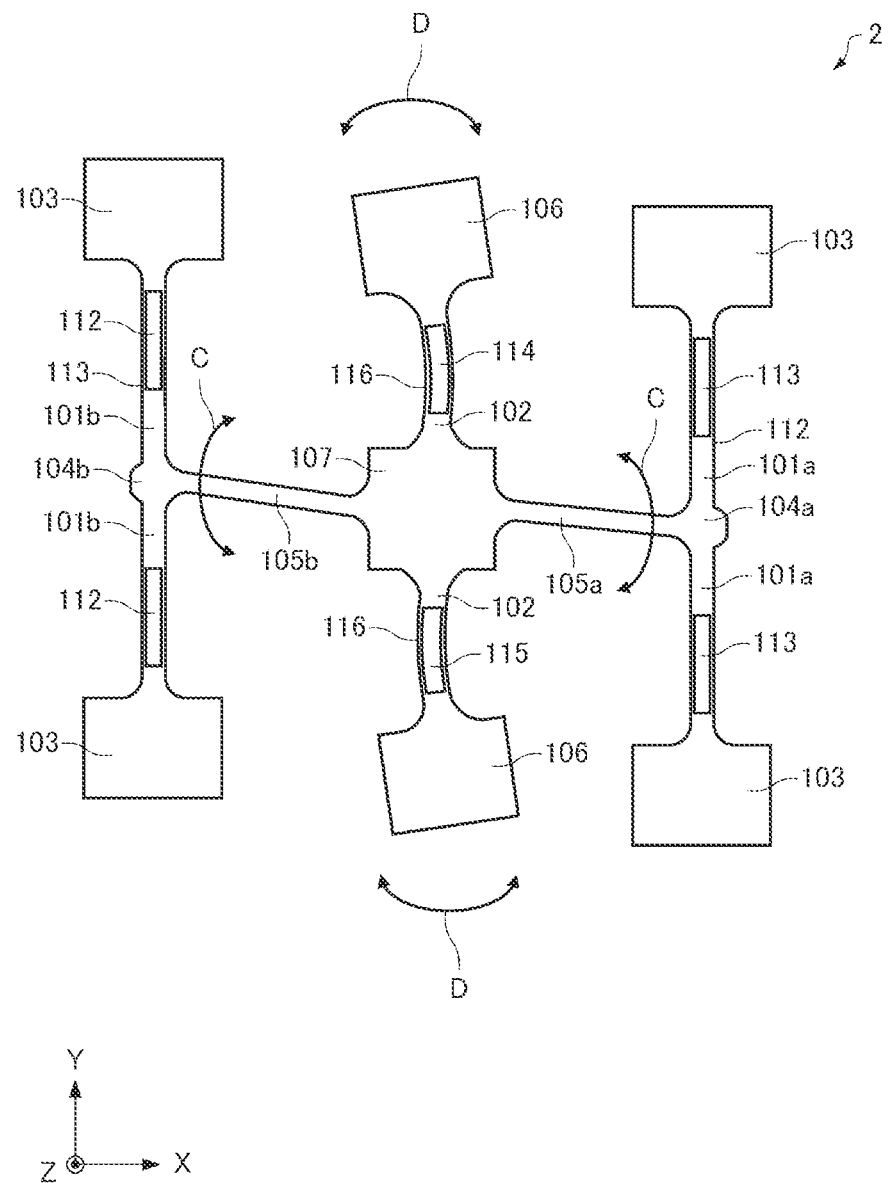
FIG. 4 is a diagram for explaining an operation of the physical quantity detection element.

In this state, when an angular velocity with the Z axis as the rotation axis is added to the vibration element of the sensor element 2, the driving vibrating arms 101a and 101b have Coriolis' power in the direction perpendicular to both the direction of the flexural vibration of the arrow B and the Z axis. As a result, as illustrated in FIG. 4, the connecting arms 105a and 105b vibrate as indicated by an arrow C. Then, the detection vibrating arm 102 bends and vibrates as indicated by an arrow D in conjunction with the vibration (arrow C) of the connecting arms 105a and 105b. The flexural vibration of the detection vibrating arm 102 and the flexural vibration (excitation vibration) of the driving vibrating arms 101a and 101b accompanying the Coriolis force are out of phase by 90 degrees.

Then, AC charges based on the flexural vibrations are generated in the detection electrodes 114 and 115 of the detection vibrating arm 102 by the piezoelectric effect. Here, the AC charges generated based on the Coriolis force varies depending on the magnitude of the Coriolis force (in other words, the magnitude of the angular velocity applied to the sensor element 2).

A rectangular weight portion 103 having a wider width than the driving vibrating arms 101a and 101b is formed at the tips of the driving vibrating arm 101a, 101b. By forming the weight portion 103 at the tips of the driving vibrating arms 101a and 101b, the Coriolis force can increase and a desired resonance frequency can be obtained with a relatively short vibrating arm. Similarly, a weight portion 106 having a wider width than the detection vibrating arm 102 is formed at the tip of the detection vibrating arm 102. By forming the weight portion 106 at the tip of the detection vibrating arm 102, it is possible to increase the number of AC charges generated in the detection electrodes 114 and 115.

As described above, the sensor element 2 outputs AC charges (an angular velocity component) based on the Coriolis force through the detection electrodes 114 and 115 with the Z axis as the detection axis. The sensor element 2 functions as an angular velocity sensor that detects angular velocity.

Returning to FIG. 1, the sensor element control device 3 includes a drive circuit 10, a detection circuit 20, a high pass filter 30, a root mean square (RMS) value conversion circuit 40, a fault diagnosis circuit 50, a storage unit 60, a diagnostic signal generation circuit 70, and a control unit 80, and it may be, for example, a one chip integrated circuit (IC). It should be noted that the sensor element control device 3 in this embodiment may have a configuration in which some of these elements are omitted or changed, or other elements are added.

The drive circuit 10 generates a drive signal $S_{drv}$ for driving (excitation vibration) the drive unit 201 of the sensor element 2 and outputs it to the drive unit 201. The drive signal $S_{drv}$ is supplied to the drive electrode 112 of the drive unit 201. In addition, the drive circuit 10 feedback-controls the amplitude level of the drive signal $S_{drv}$ so that the amplitude of the drive current output from the drive electrode 113 is maintained constant by the drive current flowing to the drive unit 201 in response to the drive signal $S_{drv}$. In addition, the drive circuit 10 generates a detection signal $S_{det}$ and outputs it to the detection circuit 20.

As illustrated in FIG. 1, the drive circuit 10 is configured to include an I/V converter 11, a comparator 12, a rectifier 13, an integrator 14, a comparator 15, and a multiplication circuit 16. It should be noted that the drive circuit 10 in this embodiment may have a configuration in which some of these elements are omitted or changed, or other elements are added.

The I/V converter 11 converts the drive current input from the drive electrode 113 of the drive unit 201 of the sensor element 2 into a voltage signal.

The comparator 12 binarizes the output voltage of the I/V converter 11 by comparing it with the reference voltage, and outputs it as the detection signal $S_{det}$. The detected signal $S_{det}$ has, for example, a power supply voltage as a high-level voltage and a ground voltage (0 V) as a low level voltage, and is output to the detection circuit 20.

The rectifier 13 rectifies (for example, full-wave rectifies) the output signal of the I/V converter 11 and outputs it.

The integrator 14 integrates the output voltage of the rectifier 13 and outputs it. The integrator 14 inverts and integrates the output voltage of the rectifier 13 based on a predetermined voltage.

The comparator 15 binarizes the output voltage of the I/V converter 11 by comparing it with the reference voltage. In the output signal (feedback signal $S_{fbk}$) of the comparator 15, the high-level voltage is the output voltage of the integrator 14 and the low level voltage is the ground voltage (0 V).

The multiplication circuit 16 multiplies the output signal (feedback signal $S_{fbk}$) of the comparator 15 by the output signal of the diagnostic signal generation circuit 70. The output signal of the multiplication circuit 16 is output to the drive unit 201 of the sensor element 2 as the drive signal $S_{drv}$, and the drive unit 201 is driven to vibrate by the drive signal $S_{drv}$.

In the present embodiment, the diagnostic signal generation circuit 70 outputs a predetermined DC signal, during normal operation (except during fault diagnosis) of the physical quantity sensor 1. Therefore, the multiplication circuit 16 multiplies the DC signal with the output signal of the comparator 15. As a result, the voltage of the output signal (drive signal $S_{drv}$) of the multiplication circuit 16 coincides with the output voltage of the comparator 15. In response to the drive signal $S_{drv}$, the drive unit 201 of the sensor element 2 self-oscillates at its resonance frequency or a frequency close to the resonance frequency. As the amplitude of the drive current input to the I/V converter 11 increases, the high-level voltage of the output signal of the comparator 15 decreases, and as the amplitude of the drive current decreases, the high-level voltage of the output signal of the comparator 15 increases, so automatic gain control (AGC) is applied so as to maintain the amplitude of the drive current constant. This causes the drive unit 201 of the sensor element 2 to be able to stably oscillate.

Figure 5:
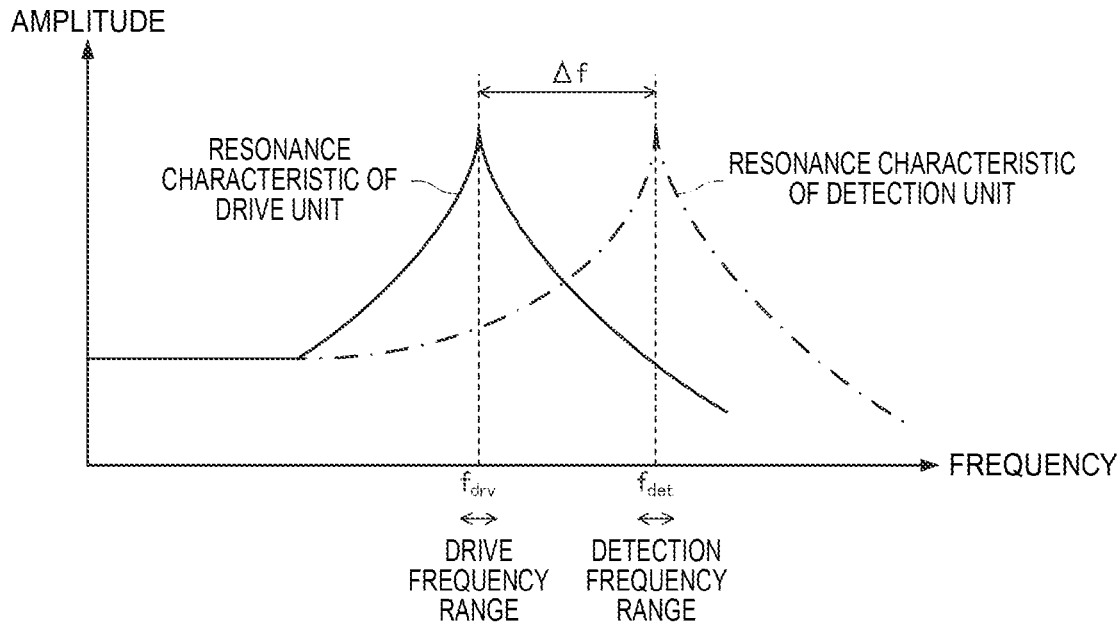
FIG. 5 is a graph for explaining a relationship between a detuning frequency and each of a drive frequency and a detection frequency.

On the other hand, at the time of fault diagnosis of the physical quantity sensor 1, the diagnostic signal generation circuit 70 generates a diagnostic signal $S_{diag}$ having a detuning frequency $\Delta f$ which is the difference frequency between the frequency (drive frequency $f_{drv}$) at which the drive unit 201 of the sensor element 2 vibrates and the frequency (detection frequency $f_{det}$) at which the detection unit 202 of the sensor element 2 vibrates. As illustrated in FIG. 5, the drive frequency $f_{drv}$ is an arbitrary frequency included in a frequency range (drive frequency range) in which the drive unit 201 can oscillate. Similarly, the detection frequency $f_{det}$ is an arbitrary frequency included in the frequency range (detection frequency range) in which the detection unit 202 can oscillate. Therefore, the detuning frequency $\Delta f$ is an arbitrary frequency included in a frequency range determined by the relationship between the frequency range in which the drive unit 201 can oscillate and the frequency range in which the detection unit 202 can oscillate. As illustrated in FIG. 5, for example, the drive frequency $f_{drv}$ may be the resonance frequency of the drive unit 201 and the detection frequency $f_{det}$ may be the resonance frequency of the detection unit 202. In this case, the detuning frequency $\Delta f$ is a difference frequency between the resonance frequency of the drive unit 201 and the resonance frequency of the detection unit 202.

In this way, at the time of fault diagnosis of the physical quantity sensor 1, the output signal of the diagnostic signal generation circuit 70 is a diagnostic signal $S_{diag}$, and the multiplication circuit 16 multiplies the output signal of the comparator 15 and the diagnostic signal $S_{diag}$. As a result, a diagnostic signal $S_{diag}$ having a detuning frequency $\Delta f$ is superimposed on the output signal (drive signal $S_{drv}$) of the multiplication circuit 16, and the drive signal $S_{drv}$ when the diagnostic signal $S_{diag}$ is superimposed is a signal obtained by amplitude-modulating (AM) the output signal (drive frequency $f_{drv}$) of the comparator 15 with the diagnostic signal $S_{diag}$ (detuning frequency $\Delta f$), and amplitude changes at the detuning frequency $\Delta f$. Therefore, the drive signal $S_{drv}$ contains a frequency component corresponding to the sum of the drive frequency $f_{drv}$ and the detuning frequency $\Delta f$, that is, a frequency component corresponding to the detection frequency $f_{det}$, and the detection unit 202 of the sensor element 2 is excited by the frequency component. Since the detuning frequency $\Delta f$ is far away from the resonance frequency of the drive unit 201, the diagnostic signal $S_{diag}$ cannot excite the drive unit 201, and the drive current input to the I/V converter 11 does not include a frequency component corresponding to the detuning frequency $\Delta f$ and does not affect the self-oscillation of the drive unit 201.

As illustrated in FIG. 1, the detection circuit 20 generates a detection signal $S_{out}$ based on a signal output from the detection unit 202 of the sensor element 2. As illustrated in FIG. 1, the detection circuit 20 is configured to include a charge amplifier 21, a charge amplifier 22, a differential amplifier 23, an AC amplifier 24, a synchronous detection circuit 25, a low pass filter 26, a low pass filter 27 and a signal adjustment circuit 28. It should be noted that the detection circuit 20 in this embodiment may have a configuration in which some of these elements are omitted or changed, or other elements are added.

At the time of angular velocity detection by the detection unit 202, the charge amplifier 21 receives AC charges (a detection current) including an angular velocity component from the detection electrode 114, and generates a signal of a voltage corresponding to the AC charges.

Similarly, the charge amplifier 22 receives AC charges (a detection current) including an angular velocity component from the detection electrode 115 of the detection unit 202, and generates a signal of a voltage corresponding to the AC charges.

The detection current input to the charge amplifier 21 and the detection current input to the charge amplifier 22 are opposite in phase (a phase difference is 180°), and the output signal of the charge amplifier 21 and the output signal of the charge amplifier 22 are also opposite in phase.

On the other hand, at the time of fault diagnosis of the physical quantity sensor 1, the detection unit 202 is excited as described above, so the detection current input to charge amplifier 21 and the detection current input to the charge amplifier 22 contain the component of the detection frequency $f_{det}$. Therefore, the output signal of the charge amplifier 21 and the output signal of the charge amplifier 22 contain the component of the detection frequency $f_{det}$.

In addition, at the time of fault diagnosis of the physical quantity sensor 1, in a case where an angular velocity is added to the sensor element 2, the output signal of the charge amplifier 21 and the output signal of the charge amplifier 22 contain the component of the detection frequency $f_{det}$ and an angular velocity component. Therefore, in the present embodiment, in order to separate the angular velocity component to be detected and the component of the detuning frequency $\Delta f$ which is the difference between the detection frequency $f_{det}$ and the drive frequency $f_{drv}$ by the circuit at the subsequent stage of the charge amplifier 21 and charge amplifier 22, the detuning frequency $\Delta f$ is set to a frequency higher than the upper limit frequency of the detection band of the angular velocity. For example, in a case where the upper limit frequency of the detection band of the angular velocity is 200 Hz, the detuning frequency $\Delta f$ can be set to 1 kHz.

The differential amplifier 23 differentially amplifies the signal output from the charge amplifier 21 and the signal output from the charge amplifier 22, and outputs a single-ended signal. By the differential amplifier 23, the in-phase noise component included in the signal output from the charge amplifier 21 and the signal output from the charge amplifier 22 is removed.

The AC amplifier 24 amplifies or attenuates the signal output from the differential amplifier 23 and outputs a signal of a desired voltage level. The AC amplifier 24 may be configured as a programmable gain amplifier (PGA).

The synchronous detection circuit 25 is a circuit that performs synchronous detection on the signal output from the detection unit 202 of the sensor element 2. Specifically, the synchronous detection circuit 25 performs synchronous detection on a signal (detected wave signal) output from the AC amplifier 24 by using the detection signal $S_{det}$ having a drive frequency $f_{drv}$ output from the drive circuit 10 to extract an angular velocity component and a component of the detuning frequency $\Delta f$ (the difference frequency between the detection frequency $f_{det}$ and the drive frequency $f_{drv}$). For example, the synchronous detection circuit 25 can be configured to output the signal output from the AC amplifier 24 as it is when the detection signal $S_{det}$ is at a high level, and output a signal obtained by inverting the signal output from the AC amplifier 24 with respect to the reference voltage when the detection signal $S_{det}$ is at the low level. Therefore, the output signal of the synchronous detection circuit 25 includes the angular velocity component and the detuning frequency $\Delta f$.

The low pass filter 26 is a filter that passes the angular velocity component and the component of the detuning frequency $\Delta f$ included in the output signal of the synchronous detection circuit 25 and attenuates high-frequency components. Therefore, the cutoff frequency of the low pass filter 26 is set to a frequency slightly higher than the detuning frequency $\Delta f$.

The low pass filter 27 is a filter that passes the angular velocity component included in the output signal of the low pass filter 26 and attenuates the component of the detuning frequency $\Delta f$. Therefore, the cutoff frequency of the low pass filter 27 is set to be slightly higher than the upper limit frequency of the detection band of the angular velocity and lower than the detuning frequency $\Delta f$.

The signal adjustment circuit 28 performs processes such as offset correction (zero-point correction), sensitivity correction, and temperature characteristic correction on the output signal (a signal of an angular velocity component) of the low pass filter 27 to generate a detection signal $S_{out}$ (angular velocity detection signal). The detection signal $S_{out}$ (angular velocity detection signal) is output to the outside of the physical quantity sensor 1.

The high pass filter 30 is a filter that passes the component of the detuning frequency $\Delta f$ included in the output signal of the low pass filter 26 and attenuates the angular velocity component. Therefore, the cutoff frequency of the high pass filter 30 is set to be slightly lower than the detuning frequency $\Delta f$ and higher than the upper limit frequency of the detection band of the angular velocity.

The low pass filter 26 and the high pass filter 30 constitute a bandpass filter whose detuning frequency $\Delta f$ is included in the passband, and the signal subjected to a bandpass filtering process on the output signal of the synchronous detection circuit 25 is converted to the RMS value conversion circuit 40.

The RMS value conversion circuit 40 converts the output signal (AC signal of the detuning frequency $\Delta f$) of the high pass filter 30 into a DC signal corresponding to its effective value and outputs it.

Figure 6:
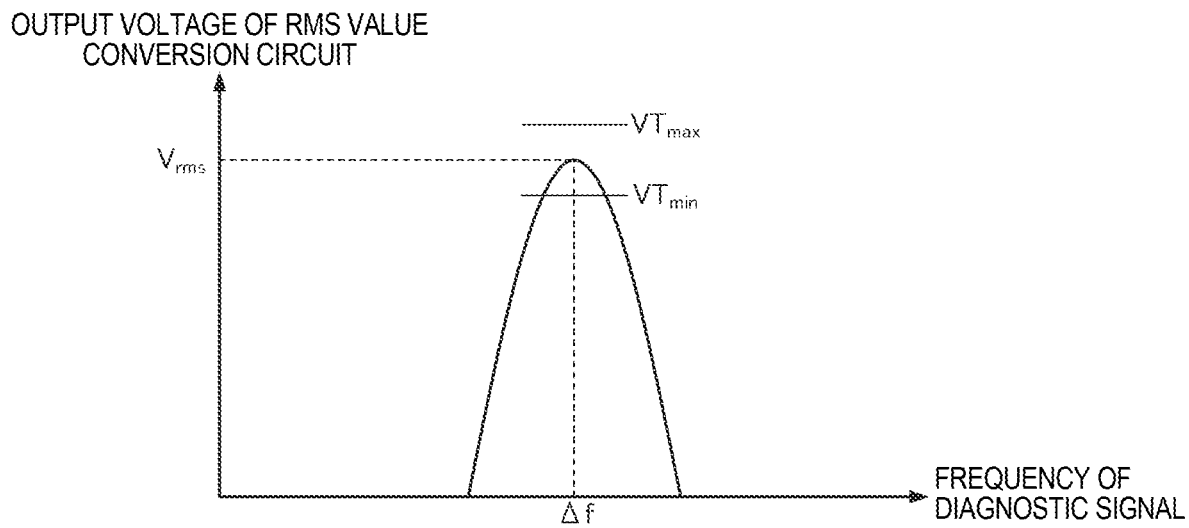
FIG. 6 is a graph for explaining an example of fault diagnosis.

The fault diagnosis circuit 50 performs fault diagnosis of the physical quantity sensor 1 based on the output signal (DC signal) of the RMS value conversion circuit 40, and generates a fault diagnosis result signal $S_{err}$ indicating the result of fault diagnosis. The fault diagnosis result signal $S_{err}$ is output to the outside of physical quantity sensor 1. In the present embodiment, the fault diagnosis circuit 50 compares the voltage value of the output signal (DC signal) of the RMS value conversion circuit 40 with a threshold, and diagnoses a fault of the physical quantity sensor 1 based on the comparison result. For example, as illustrated in FIG. 6, the fault diagnosis circuit 50 compares the voltage value $V_{rms}$ of the output signal (DC signal) of the RMS value conversion circuit 40 with the upper limit threshold $VT_{max}$ and the lower limit threshold $VT_{min}$. If it is the lower limit threshold $VT_{min}$ or more and the upper limit threshold $VT_{max}$ or less, it may be diagnosed that there is no fault, and in a case where it is smaller than the lower limit threshold $VT_{min}$ or larger than the upper limit threshold $VT_{max}$, it may be diagnosed that there is a fault.

The control unit 80 controls the operation of the diagnostic signal generation circuit 70 and the operation of the fault diagnosis circuit 50. In the present embodiment, the control unit 80 instructs the diagnostic signal generation circuit 70 to generate a diagnostic signal $S_{diag}$ at the time of activation of the physical quantity sensor 1 (the sensor element control device 3) (after power is supplied and the oscillation of the drive unit 201 is stabilized), and instructs the fault diagnosis circuit 50 to perform fault diagnosis after a predetermined time has elapsed (after the drive unit 201 oscillates stably and the detection unit 202 of the sensor element 2 is excited). That is, in the present embodiment, at the time of activation of the physical quantity sensor 1 (sensor element control device 3), the diagnostic signal generation circuit 70 generates the diagnostic signal $S_{diag}$, and the fault diagnosis circuit 50 performs fault diagnosis.

Further, the control unit 80 instructs the diagnostic signal generation circuit 70 to generate a diagnostic signal $S_{diag}$ when fault diagnosis is requested by a control signal $S_{cntl}$ supplied from outside the physical quantity sensor 1, and instructs the fault diagnosis circuit 50 to perform fault diagnosis after a predetermined time has elapsed (after the detection unit 202 of the sensor element 2 is excited). That is, in the present embodiment, even when fault diagnosis is requested by the control signal $S_{cntl}$, the diagnostic signal generation circuit 70 generates the diagnostic signal $S_{diag}$, and the fault diagnosis circuit 50 performs fault diagnosis.

As described above, since the component of the detuning frequency Δf is set by the low pass filter 27, the influence of the diagnostic signal $S_{diag}$ on the detection signal $S_{out}$ is very small. Therefore, after activation of the physical quantity sensor 1 (the sensor element control device 3), the diagnostic signal generation circuit 70 may generate a diagnostic signal $S_{diag}$ at all times or at a constant period (even during angular velocity detection) irrespective of the control signal $S_{cntl}$, and the fault diagnosis circuit 50 may perform fault diagnosis.

As described above, in the present embodiment, the fault diagnosis circuit 50 performs fault diagnosis based on the signal output from the detection unit 202 of the sensor element 2 when the diagnostic signal $S_{diag}$ is superimposed on the drive signal $S_{drv}$. Specifically, the fault diagnosis circuit 50 performs fault diagnosis at the time of activation of the physical quantity sensor 1 (the sensor element control device 3), and further performs fault diagnosis at a predetermined timing after activation of the physical quantity sensor 1 (the sensor element control device 3).

The storage unit 60 includes a non-volatile memory such as a metal oxide nitride oxide silicon (MONOS) type memory or an electrically erasable programmable read-only memory (EEPROM), and in the nonvolatile memory, various types of information are set from outside the physical quantity sensor 1 (the sensor element control device 3) through an interface circuit (not shown) included in the sensor element control device 3.

For example, the storage unit 60 (non-volatile memory) stores the information on the thresholds (the upper limit threshold $VT_{max}$ and the lower limit threshold $VT_{min}$) for the above-mentioned fault diagnosis, the thresholds (the upper limit threshold $VT_{max}$ and the lower limit threshold $VT_{min}$) may be variably set. Then, the fault diagnosis circuit 50 may compares the voltage value of the output signal (DC signal) of the RMS value conversion circuit 40 with the thresholds (the upper limit threshold $VT_{max}$ and the lower limit threshold $VT_{min}$) stored in the storage unit 60, and diagnose a fault of the physical quantity sensor 1 based on the comparison result.

Further, for example, the storage unit 60 (non-volatile memory) stores information on the detuning frequency Δf, and the detuning frequency Δf may be variably set. The diagnostic signal generation circuit 70 may generate a diagnostic signal $S_{diag}$ having the detuning frequency Δf stored in the storage unit 60.

In addition, for example, amplitude information of the diagnostic signal $S_{diag}$ is stored in the storage unit 60 (non-volatile memory), and the amplitude of diagnostic signal $S_{diag}$ may be variably set.

This makes it possible to appropriately set the amplitude and the detuning frequency Δf of the diagnostic signal $S_{diag}$ according to the difference in the characteristics of each sensor element 2 due to the manufacturing variation or the like or according to a change over time of the sensor element 2, so a certain fault diagnosis accuracy can be realized.

In addition, the diagnostic signal generation circuit 70 may change the amplitude of the diagnostic signal $S_{diag}$, based on the amplitude of the signal (drive current) output from the drive unit 201 of the sensor element 2. For example, a correction function for correcting the amplitude of diagnostic signal $S_{diag}$ with the output voltage value of the integrator 14 as a variable is stored in the storage unit 60 (non-volatile memory), and the diagnostic signal generation circuit 70 may perform change (correction) such that the amplitude of diagnostic signal $S_{diag}$ decrease as the output voltage of the integrator 14 increases, based on the correction function.

Thus, even if the amplitude of the detected current changes due to the temperature change, a change over time, of the like of the sensor element 2, the amplitude of the diagnostic signal $S_{diag}$ is appropriately corrected, so that it is possible to realize a constant fault diagnosis accuracy.

Figure 7:
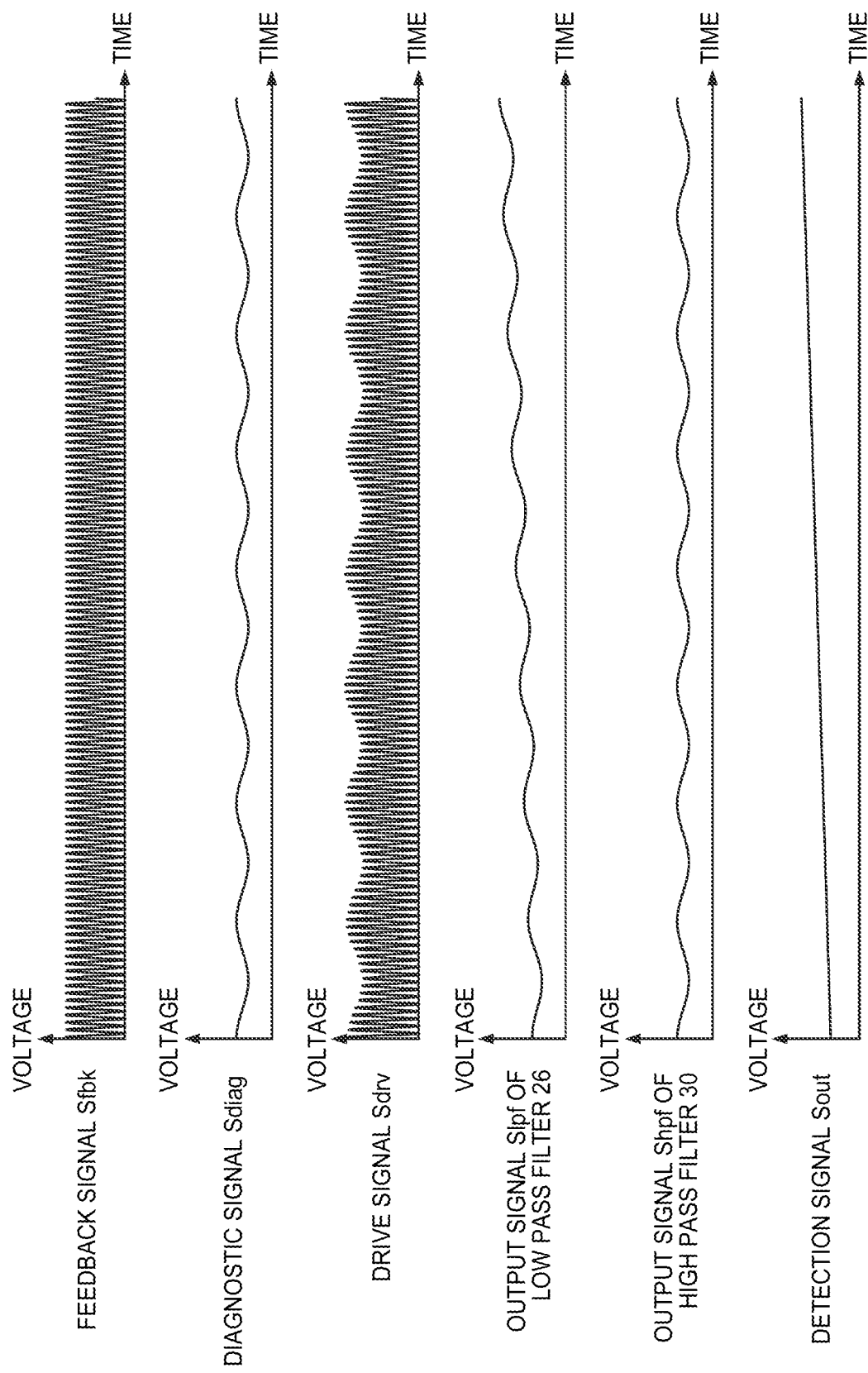
FIG. 7 is a graph illustrating an example of a signal waveform at a time of fault diagnosis.

FIG. 7 illustrates an example of a signal waveform at a time of fault diagnosis. In FIG. 7, for example, the feedback signal $S_{fbk}$ is a rectangular wave signal of 50 kHz and the diagnostic signal $S_{diag}$ is a sinusoidal wave signal of 1 kHz. That is, the detuning frequency Δf is, for example, 1 kHz. Therefore, the drive signal $S_{drv}$ is a signal obtained by applying amplitude modulation at 1 kHz to a rectangular wave of 50 kHz. At this time, the output signal $S_{lpf}$ of the low pass filter 26 is a signal including the angular velocity component and the component of the detuning frequency Δf (sinusoidal wave of 1 kHz). The output signal $S_{hpf}$ of the high pass filter 30 is a signal of a detuning frequency Δf (a sinusoidal wave of 1 kHz) not including the angular velocity component, and the detection signal $S_{out}$ is a signal of a voltage value corresponding to an angular velocity not including the component of the detuning frequency Δf (a sinusoidal wave of 1 kHz). As described above, in the physical quantity sensor 1 (sensor element control device 3) of the present embodiment, detection of an angular velocity and fault diagnosis can be performed at the same time.

Figure 8:
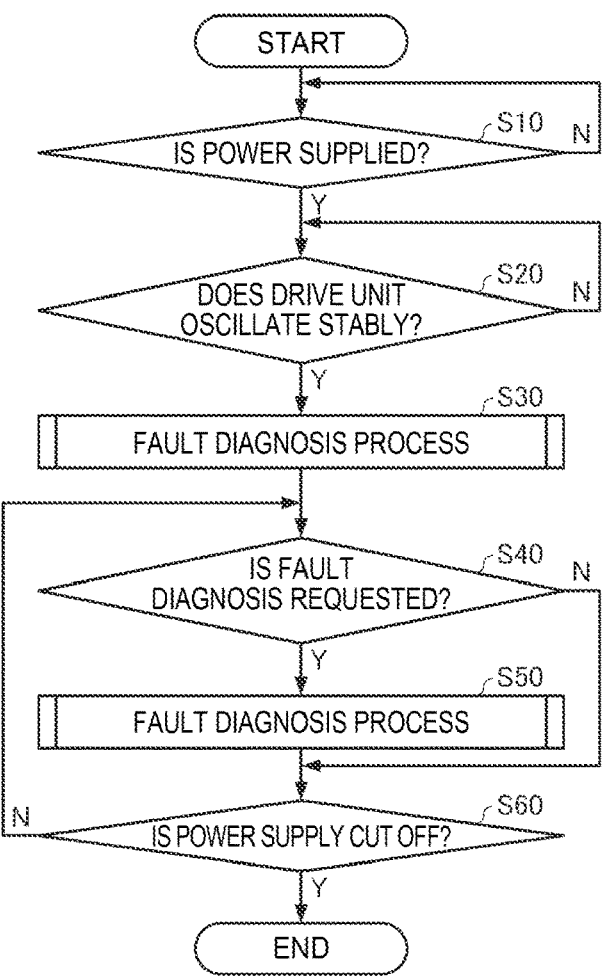
FIG. 8 is a flowchart illustrating an example of a procedure of a fault diagnosis method.

FIG. 8 is a flowchart illustrating an example of a procedure of a fault diagnosis method by the physical quantity sensor 1 (sensor element control device 3).

In the example of FIG. 8, when power is supplied to the physical quantity sensor 1 (Y in step S10), the drive signal $S_{drv}$ waits until the drive unit 201 of the sensor element 2 oscillates stably (N in step S20). For example, the physical quantity sensor 1 may wait until a predetermined time (a time longer than the time required for stable oscillation of the drive unit 201), which is determined in advance, has elapsed after power is supplied, or may wait until the voltage value of the integrator 14 is included in the predetermined range continuously for a predetermined time.

Next, if the drive unit 201 oscillates stably (Y in step S20), the physical quantity sensor 1 performs a fault diagnosis process (step S30). The process of step S30 is a fault diagnosis process performed when the physical quantity sensor 1 is activated.

Next, in a case where fault diagnosis is requested by the control signal $S_{cntl}$ (step S40), the physical quantity sensor 1 performs the fault diagnosis process (step S50). The process of step S50 is a fault diagnosis process performed at a predetermined timing after activation of the physical quantity sensor 1.

Then, the physical quantity sensor 1 repeats the process of step S40 and step S50 until the power supply is cut off (N in step S60).

Figure 9:
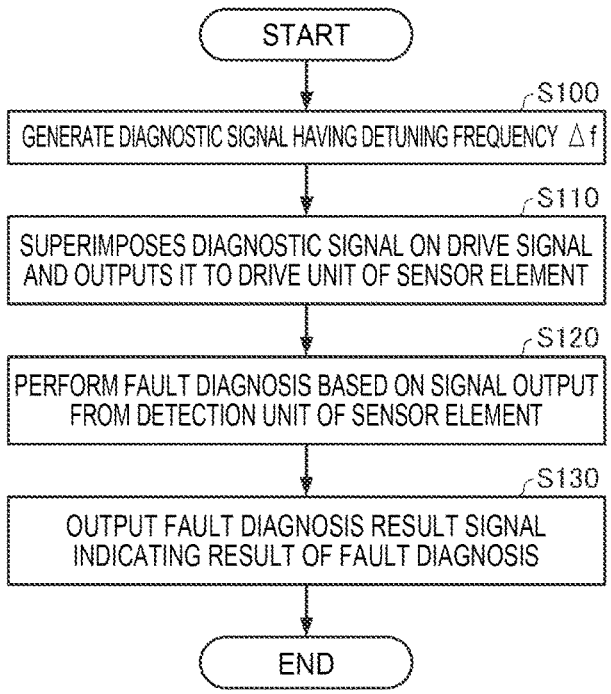
FIG. 9 is a flowchart illustrating an example of a procedure of a fault diagnosis process in a first embodiment.

FIG. 9 is a flowchart illustrating an example of the procedure of the fault diagnosis process of step S30 and the fault diagnosis process of S50 in FIG. 8.

In the example of FIG. 9, first, the physical quantity sensor 1 generates a diagnostic signal $S_{diag}$ having the detuning frequency Δf (step S100).

Next, the physical quantity sensor 1 superimposes the diagnostic signal $S_{diag}$ generated at step S100 on the drive signal $S_{drv}$ and outputs it to the drive unit 201 of the sensor element 2 (step S110).

Next, the physical quantity sensor 1 performs fault diagnosis based on the signal output from the detection unit 202 of the sensor element 2 (step S120).

Finally, the physical quantity sensor 1 outputs a fault diagnosis result signal $S_{err}$ indicating the result of the fault diagnosis in step S120 (step S130).

As described above, in the physical quantity sensor 1 of the first embodiment, the sensor element control device 3 outputs the drive signal $S_{drv}$ on which the diagnostic signal $S_{diag}$ having the detuning frequency $\Delta f$ is superimposed to the drive unit 201 of the sensor element 2, so that the detection unit 202 of the sensor element 2 is excited to vibrate at the detection frequency $f_{det}$ which is the sum of the drive frequency $f_{drv}$ and the detuning frequency $\Delta f$. Therefore, the sensor element control device 3 can diagnose a fault such as a disconnection between the sensor element 2 and the sensor element control device 3 or a defect of the sensor element 2, based on the signal (detection current) output from the detection unit 202. According to the physical quantity sensor 1 of the first embodiment, fault diagnosis is performed without using the electrostatic coupling capacitance difference between the drive electrode of the sensor element 2 and the two detection electrodes, so that the electrostatic coupling capacitance difference may be reduced, and even if the drive amplitude level changes, the influence on the detection accuracy of the physical quantity (angular velocity) can be reduced.

In the physical quantity sensor 1 of the first embodiment, since the drive signal $S_{drv}$ is a signal subjected to AM modulation instead of FM modulation at the detuning frequency $\Delta f$ at the time of fault diagnosis, the drive frequency $f_{drv}$ is maintained constant. Therefore, according to the physical quantity sensor 1 of the first embodiment, it is possible to excite the detection unit 202 while stably oscillating the drive unit 201 of the sensor element 2, so that the sensor element control device 3 can perform the fault diagnosis with high accuracy.

According to the physical quantity sensor 1 of the first embodiment, the frequency (detuning frequency $\Delta f$) and amplitude of the diagnostic signal $S_{diag}$ are variably set in the storage unit 60, so the sensor element control device 3 can perform fault diagnosis with high accuracy, based on the diagnostic signal $S_{diag}$ whose frequency (detuning frequency $\Delta f$) and amplitude are appropriately set.

Further, according to the physical quantity sensor 1 of the first embodiment, the sensor element control device 3 can perform fault diagnosis with high accuracy even if the drive amplitude level changes due to the temperature characteristic and the change over time of the sensor element 2, by changing (correcting) the amplitude of the diagnostic signal $S_{diag}$ based on the amplitude (the output voltage of the integrator 14) of the signal (drive current) output from the drive unit 201.

Further, in the physical quantity sensor 1 of the first embodiment, the component of the detuning frequency $\Delta f$ is not attenuated and the angular velocity component is attenuated by the bandpass filter configured with the low pass filter 26 and the high pass filter 30, and they are input to the RMS value conversion circuit 40. On the other hand, the angular velocity component is not attenuated and the component of the detuning frequency $\Delta f$ is attenuated by the low pass filter 27, and they are input to the signal adjustment circuit 28. Therefore, according to the physical quantity sensor 1 of the first embodiment, the sensor element control device 3 can simultaneously perform generation of the detection signal $S_{out}$ by the detection circuit 20 and the fault diagnosis by the fault diagnosis circuit 50.

Further, according to the physical quantity sensor 1 of the first embodiment, since the sensor element control device 3 performs fault diagnosis at the time of activation and further performs fault diagnosis at a predetermined timing based on the control signal $S_{cntl}$ after the activation, in a case where a fault occurs while it is stopped, it is possible to detect a fault immediately after the activation and also to detect a fault occurring after the activation.

1-2. Second Embodiment

Hereinafter, with regard to a physical quantity sensor 1 of a second embodiment, the same reference numerals are given to the same configurations as those of the first embodiment, descriptions overlapping with those of the first embodiment is omitted, and the contents different from the first embodiment will be mainly described.

When a defect or the like occurs in a part of the drive unit 201 of the sensor element 2, the resonance frequency of the drive unit 201 changes, and as a result, the drive frequency $f_{drv}$ changes. Similarly, when a defect or the like occurs in apart of the detection unit 202 of the sensor element 2, the resonance frequency of the detection unit 202 changes, and as a result, the detection frequency $f_{det}$ changes. When the drive frequency $f_{drv}$ or the detection frequency $f_{det}$ changes, there is a possibility that the detection accuracy of the angular velocity decreases. Therefore, it is sometimes desirable to diagnose a fault in a state where the drive frequency $f_{drv}$ or the detection frequency $f_{det}$ changes. However, in the physical quantity sensor 1 of the first embodiment, at the time of fault detection by the physical quantity sensor 1, the fault diagnosis circuit 50 compares, for example, the voltage value $V_{rms}$ of the output signal (DC signal) of the RMS value conversion circuit 40 with the upper limit threshold $VT_{max}$ and the lower limit threshold $VT_{min}$, and diagnoses that there is no fault when it is the lower limit threshold $VT_{min}$ or more and the upper limit threshold $VT_{max}$ or less, such that it is diagnosed that there is no fault when the voltage value $V_{rms}$ of the output signal (DC signal) of the RMS value conversion circuit 40 after the drive frequency $f_{drv}$ or the detection frequency $f_{det}$ changes is still the lower limit threshold $VT_{min}$ or more and the upper limit threshold $VT_{max}$ or less. Thus, in the physical quantity sensor 1 of the second embodiment, at the time of fault diagnosis, the diagnostic signal generation circuit 70 generates a plurality of diagnostic signals $S_{diag}$ having detuning frequencies $\Delta f$ which are different from each other, and the fault diagnosis circuit 50 performs fault diagnosis, based on the signal (detection current) output from the detection unit 202 of the sensor element 2 when each of the plurality of diagnostic signals $S_{diag}$ is superimposed on the drive signal $S_{drv}$.

Figure 10:
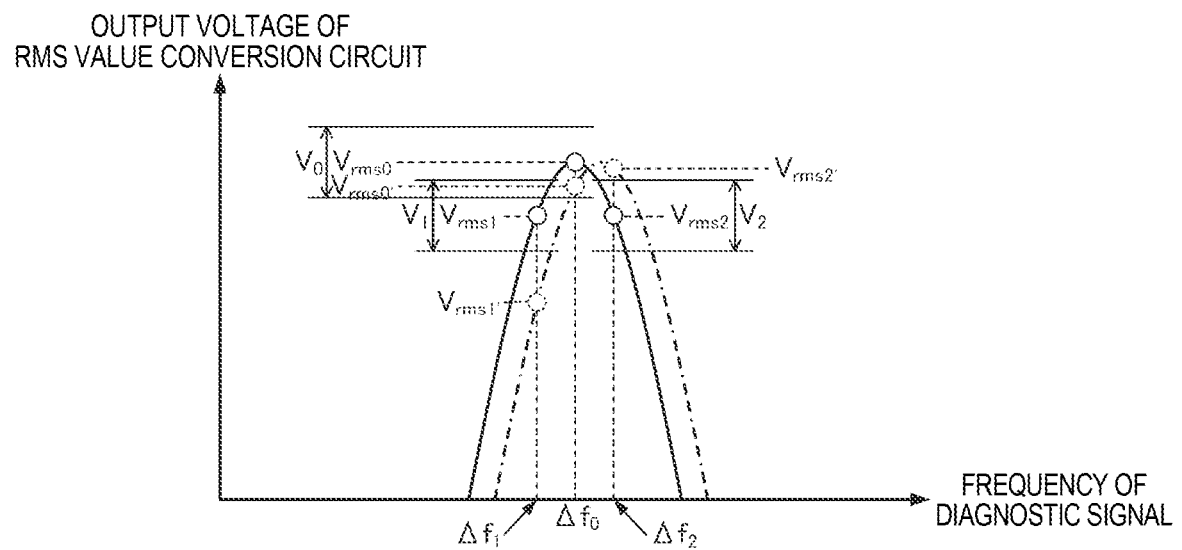
FIG. 10 is a graph for explaining an example of fault diagnosis in a second embodiment.

For example, as illustrated in FIG. 10, the diagnostic signal generation circuit 70 generates three diagnostic signal $S_{diags}$ having detuning frequencies $\Delta f_0$, $\Delta f_1$, and $\Delta f_2$ ($\Delta f_1 < \Delta f_0 < \Delta f_2$) which are different from each other. For example, information on the detuning frequencies $\Delta f_0$, $\Delta f_1$, and $\Delta f_2$ may be stored in the storage unit 60 (non-volatile memory). In a case where the drive frequency $f_{drv}$ or the detection frequency $f_{det}$ has not changed from the time of shipment, the voltage of the output signal (DC signal) of the RMS value conversion circuit 40 indicates behavior as indicated by the solid line in FIG. 10 with respect to the frequency of the diagnostic signal $S_{diag}$. In this case, the voltage value $V_{rms0}$ when the diagnostic signal $S_{diag}$ having the detuning frequency $\Delta f_0$ is superimposed on the drive signal $S_{drv}$ is included in the voltage range $V_0$ of the lower limit threshold $VT_{min0}$ or more and the upper limit threshold $VT_{max0}$ or less corresponding to the detuning frequency $\Delta f_0$. Similarly, the voltage value $V_{rms1}$ when the diagnostic signal $S_{diag}$ having the detuning frequency $\Delta f_1$ is superimposed on the drive signal $S_{drv}$ is included in the voltage range $V_1$ of the lower limit threshold $VT_{min1}$ or more and the upper limit threshold $VT_{max1}$ or less corresponding to the detuning frequency $\Delta f_1$. Similarly, the voltage value $V_{rms2}$ when the diagnostic signal $S_{diag}$ having the detuning frequency $\Delta f_2$ is superimposed on the drive signal $S_{drv}$ is included in the voltage range $V_2$ of the lower limit threshold $VT_{min2}$ or more and the upper limit threshold $VT_{max2}$ or less corresponding to the detuning frequency $\Delta f_2$. In this case, the fault diagnosis circuit 50 diagnoses that there is no fault because the voltage values $V_{rms0}$, $V_{rms1}$, and $V_{rms2}$ when three diagnostic signals $S_{diag}$ respectively having the detuning frequencies $\Delta f_0$, $\Delta f_1$, and $\Delta f_2$ are respectively superimposed on the drive signal $S_{drv}$ are respectively included in the appropriate voltage ranges $V_0$, $V_1$, and $V_2$.

On the other hand, in a case where the drive frequency $f_{drv}$ or the detection frequency $f_{det}$ has changed from the time of shipment, the voltage of the output signal (DC signal) of the RMS value conversion circuit 40 indicates behavior as indicated by the alternate long and short dashed line in FIG. 10 with respect to the frequency of the diagnostic signal $S_{diag}$. In this case, the voltage value $V_{rms0}$, when the diagnostic signal $S_{diag}$ having the detuning frequency $\Delta f_0$ is superimposed on the drive signal $S_{drv}$ is included in the appropriate voltage range $V_0$. However, the voltage value $V_{rms1}$, when the diagnostic signal $S_{diag}$ having the detuning frequency $\Delta f_1$ is superimposed on the drive signal $S_{drv}$ is not included in the appropriate voltage range $V_1$. Similarly, the voltage value $V_{rms2}$, when the diagnostic signal $S_{diag}$ having the detuning frequency $\Delta f_2$ is superimposed on the drive signal $S_{drv}$ is not included in the appropriate voltage range $V_2$. In this case, the fault diagnosis circuit 50 diagnoses that there is a fault because the voltage values $V_{rms1}$, and $V_{rms2}$, when two diagnostic signals $S_{diag}$ respectively having the detuning frequencies $\Delta f_1$ and $\Delta f_2$ are respectively superimposed on the drive signal $S_{drv}$ are not respectively included in the appropriate voltage ranges $V_1$ and $V_2$.

Figure 11:
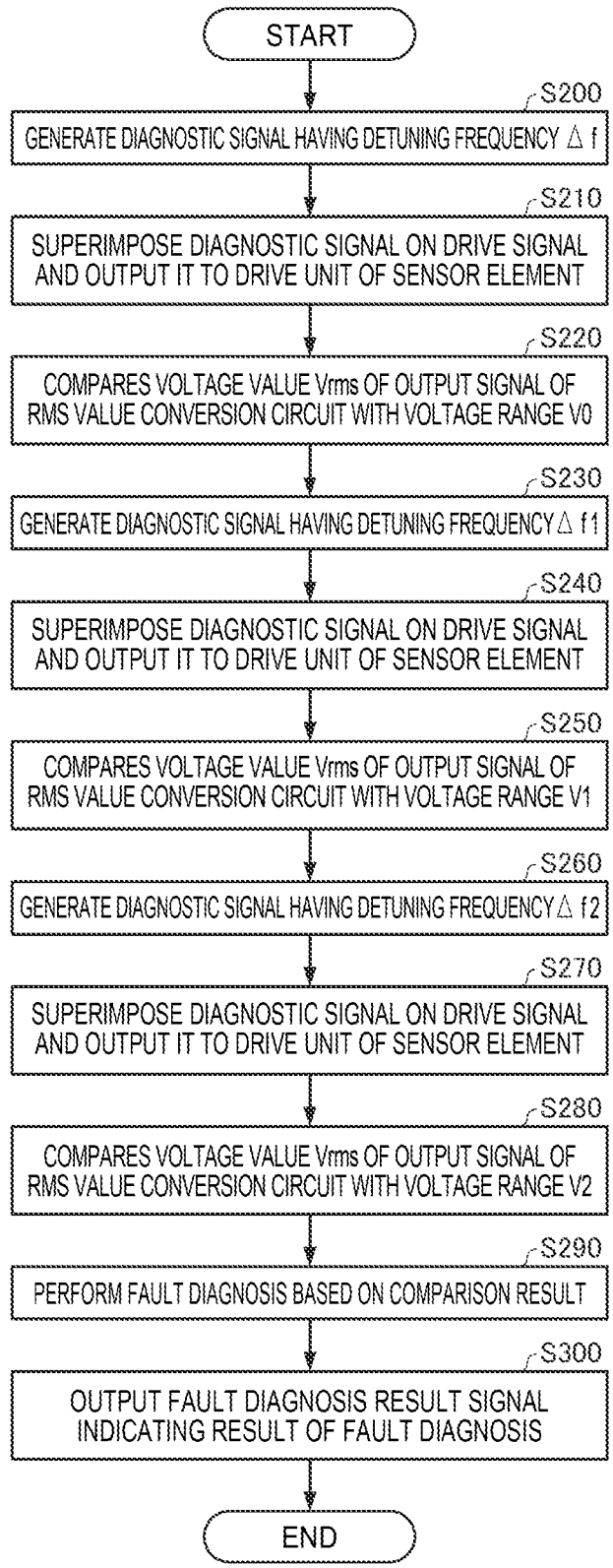
FIG. 11 is a flowchart illustrating an example of a procedure of a fault diagnosis process in the second embodiment.

FIG. 11 is a flowchart illustrating an example of the procedure of the fault diagnosis process (a process of step S30 and step S50 in FIG. 8) in the second embodiment.

In the example of FIG. 11, first, the physical quantity sensor 1 generates a diagnostic signal $S_{diag}$ having the detuning frequency $\Delta f_0$ (step S200).

Next, the physical quantity sensor 1 superimposes the diagnostic signal $S_{diag}$ generated at step S200 on the drive signal $S_{drv}$ and outputs it to the drive unit 201 of the sensor element 2 (step S210).

Next, the physical quantity sensor 1 compares the voltage value $V_{rms}$ of the output signal (DC signal) of the RMS value conversion circuit 40 with the voltage range $V_0$ (step S220).

Next, the physical quantity sensor 1 generates a diagnostic signal $S_{diag}$ having the detuning frequency $\Delta f_1$ (step S230).

Next, the physical quantity sensor 1 superimposes the diagnostic signal $S_{diag}$ generated at step S230 on the drive signal $S_{drv}$ and outputs it to the drive unit 201 of the sensor element 2 (step S240).

Next, the physical quantity sensor 1 compares the voltage value $V_{rms}$ of the output signal (DC signal) of the RMS value conversion circuit 40 with the voltage range $V_1$ (step S250).

Next, the physical quantity sensor 1 generates a diagnostic signal $S_{diag}$ having the detuning frequency $\Delta f_2$ (step S260).

Next, the physical quantity sensor 1 superimposes the diagnostic signal $S_{diag}$ generated at step S260 on the drive signal $S_{drv}$ and outputs it to the drive unit 201 of the sensor element 2 (step S270).

Next, the physical quantity sensor 1 compares the voltage value $V_{rms}$ of the output signal (DC signal) of the RMS value conversion circuit 40 with the voltage range $V_2$ (step S280).

Next, the physical quantity sensor 1 performs fault diagnosis based on the comparison result of step S220, step S250, and step S280 (step S290). For example, in a case where the voltage value $V_{rms}$ is included in the voltage range $V_0$ in step S220, the voltage value $V_{rms}$ is included in the voltage range $V_1$ in step S250, and the voltage value $V_{rms}$ is included in the voltage range $V_2$ in step S280, the physical quantity sensor 1 diagnoses that there is no fault. Otherwise, it is diagnosed that there is a fault.

Finally, the physical quantity sensor 1 outputs a fault diagnosis result signal $S_{err}$ indicating the result of the fault diagnosis in step S290 (step S300).

According to the physical quantity sensor 1 of the second embodiment described above, the same effect as the physical quantity sensor 1 of the first embodiment is exerted.

Further, in the physical quantity sensor 1 of the second embodiment, the sensor element control device 3 performs fault diagnosis based on a plurality of drive signals $S_{drv}$ on which a plurality of diagnostic signals $S_{diag}$ having different detuning frequencies $\Delta f_0$, $\Delta f_1$, and $\Delta f_2$ are sequentially superimposed. Therefore, according to the physical quantity sensor 1 according to the second embodiment, in a case where the difference between the resonance frequency of the drive unit 201 and the resonance frequency of the detection unit 202 change due to a defect of the sensor element 2 or the like, the level of the signal output from the detection unit 202 greatly changes when any diagnostic signal $S_{diag}$ is superimposed, so that the accuracy of fault diagnosis can be improved.

1-3. Modification Example

Figure 12:
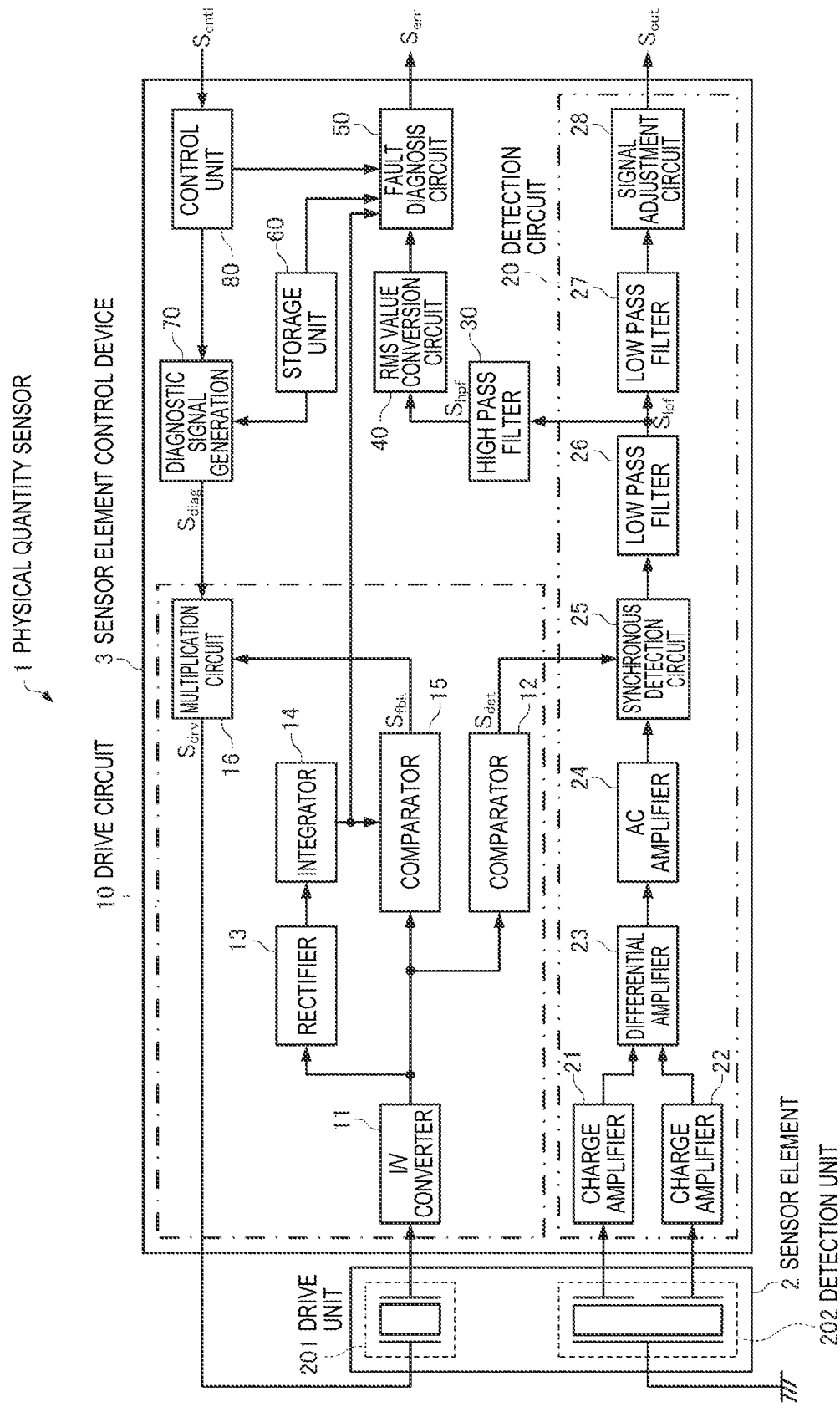
FIG. 12 is a functional block diagram of a modification example of the physical quantity sensor according to the present embodiment.

The fault diagnosis circuit 50 may change the threshold (the upper limit threshold $VT_{max}$ and the lower limit threshold $VT_{min}$) for fault diagnosis, based on the amplitude of the signal (drive current) output from the drive unit 201 of the sensor element 2. For example, as illustrated in FIG. 12, a correction function for correcting the upper limit threshold $VT_{max}$ and the lower limit threshold $VT_{min}$ with the output voltage value of the integrator 14 as a variable is stored in the storage unit 60 (non-volatile memory), and the fault diagnosis circuit 50 may perform change (correction) such that the upper limit threshold $VT_{max}$ and the lower limit threshold $VT_{min}$ increase as the output voltage of the integrator 14 increases, based on the correction function. In this way, the sensor element control device 3 can perform fault diagnosis with high accuracy even if the drive amplitude level changes due to the temperature characteristic and the change over time of the sensor element 2, and as a result, the amplitude of the signal (detection current) output from the detection unit 202 changes, by changing (correcting) the threshold (upper limit threshold $VT_{max}$ and the lower limit threshold $VT_{min}$) for fault diagnosis, based on the amplitude (the output voltage of the integrator 14) of the signal (drive current) output from the drive unit 201. In the case of this modification example, the diagnostic signal generation circuit 70 may not change the amplitude of the diagnostic signal $S_{diag}$, based on the amplitude of the signal (drive current) output from the drive unit 201 of the sensor element 2, but may change it. For example, as the output voltage of the integrator 14 increases, the diagnostic signal generation circuit 70 may change the amplitude of the diagnostic signal $S_{diag}$ to decrease, and the fault diagnosis circuit 50 may change the upper limit threshold $VT_{max}$ and the lower limit threshold $VT_{min}$ to increase.

In each of the above embodiments, in the physical quantity sensor 1 (sensor element control device 3), the fault diagnosis circuit 50 performs fault diagnosis by comparing the voltage value of the DC signal obtained by applying RMS value conversion on the output signal from the synchronous detection circuit 25 subjected to bandpass filtering process with a threshold, but fault diagnosis may be performed by other fault diagnosis methods. For example, a phase comparator to which an output signal from the synchronous detection circuit 25, which is band-pass filtered by the low pass filter 26 and the high pass filter 30 and a signal based on the diagnostic signal $S_{diag}$ are input is provided, and the fault diagnosis circuit 50 may perform fault diagnosis by comparing the signal based on a result of phase comparison by the phase comparator with a threshold.

In each of the above embodiments, the physical quantity sensor 1 (the sensor element control device 3) outputs the detection signal $S_{out}$ and the fault diagnosis result signal $S_{err}$ to the outside as an analog signal S, but the physical quantity sensor 1 may generate a detection signal $S_{out}$ of a digital signal and a fault diagnosis result signal $S_{err}$, and output them to the outside through a serial interface circuit (not shown). In the case of this modification example, the physical quantity sensor 1 may receive a fault diagnosis command through a serial interface circuit (not shown), instruct the diagnostic signal generation circuit 70 to generate a diagnostic signal $S_{diag}$, and may instruct the fault diagnosis circuit 50 to perform fault diagnosis.

In each of the above embodiments, the vibration element of the sensor element 2 is a double T type but may be an H type, a tuning fork type or a comb type, or may be a speech piece type having a shape such as a triangular prism, a quadrangular prism, and a columnar shape.

In each of the above-described embodiments, the sensor element 2 detects an angular velocity, but may also be capable of detecting physical quantities other than the angular velocity, such as an angular acceleration, an acceleration, geomagnetism, inclination, and the like.

In the above-described embodiments, the material of the vibration element of the sensor element 2 is quartz crystal ($SiO_2$), but may be a piezoelectric material such as piezoelectric single crystals such as lithium tantalate ($LiTaO_3$) and lithium niobate ($LiNbO_3$), piezoelectric ceramics such as lead zirconate titanate (PZT). In addition, the vibration element of the sensor element 2 may have a structure using a silicon semiconductor, or a structure in which a piezoelectric thin film such as zinc oxide (ZnO) and aluminum nitride (AlN) sandwiched between drive electrodes are disposed on a part of the surface of the silicon semiconductor. The sensor element 2 is not limited to a piezoelectric type element but may be a vibration type element such as an electrodynamic type, a capacitive type, an eddy current type, an optical type, and a strain gauge type.

2. Electronic Device

Figure 13:
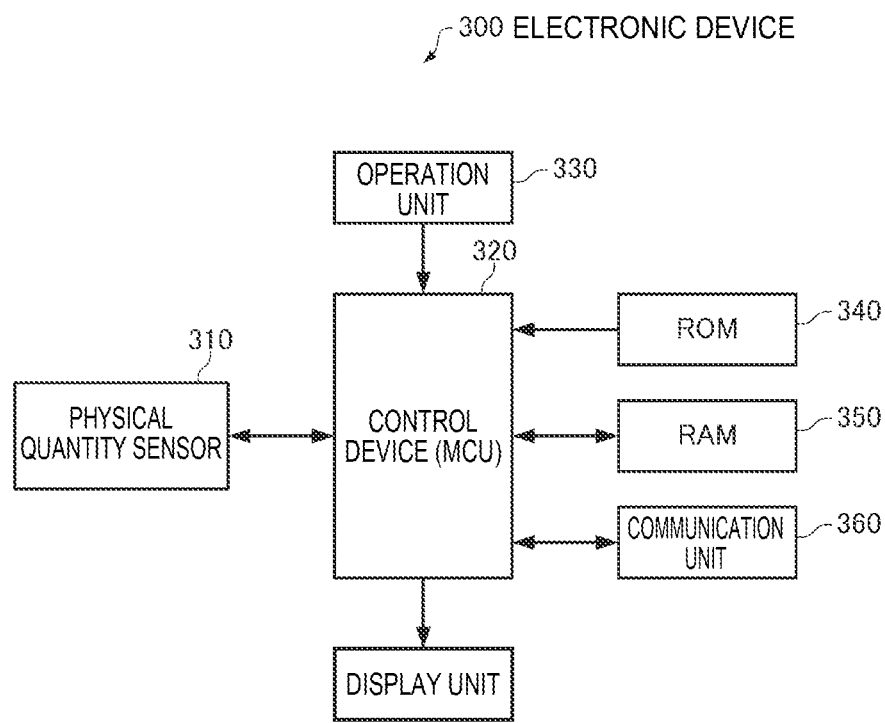
FIG. 13 is a functional block diagram illustrating an example of a configuration of an electronic device according to the present embodiment.

FIG. 13 is a functional block diagram illustrating an example of a configuration of an electronic device according to the present embodiment. As illustrated in FIG. 13, the electronic device 300 of the present embodiment includes a physical quantity sensor 310, a control device (MCU) 320, an operation unit 330, a read only memory (ROM) 340, a random access memory (RAM) 350, a communication unit 360, and a display unit 370. It is to be noted that the electronic device according to the present embodiment may be configured in such a manner that a part of the constituent elements (respective portions) in FIG. 13 is omitted or changed, or other constituent elements are added.

The physical quantity sensor 310 detects the physical quantity and outputs the detection result to the control device (MCU) 320. As the physical quantity sensor 310, for example, the physical quantity sensor 1 of the present embodiment described above can be applied.

According to the program stored in the ROM 340 or the like, the control device (MCU) 320 transmits a communication signal to the physical quantity sensor 310, and performs various calculation processes and control processes using the output signal of the physical quantity sensor 310. In addition, the control device (MCU) 320 performs various processes according to the operation signal from the operation unit 330, a process of controlling the communication unit 360 for data communication with an external device, a process of transmitting a display signal for displaying various types of information on the display unit 370, and the like.

The operation unit 330 is an input device including an operation key, a button switch, and the like, and outputs an operation signal corresponding to an operation by a user to the control device (MCU) 320.

The ROM 340 stores programs, data, and the like for the control device (MCU) 320 to perform various calculation processes and control processes.

The RAM 350 is used as a work area of the control device (MCU) 320, and temporarily stores programs and data read from the ROM 340, data input from the operation unit 330, results of calculations executed by the control device (MCU) 320 according to various programs, or the like.

The communication unit 360 performs various controls for establishing data communication between the control device (MCU) 320 and the external device.

The display unit 370 is a display device composed of a liquid crystal display (LCD) or the like, and displays various types of information based on a display signal input from the MCU 320. A touch panel functioning as the operation unit 330 may be provided in the display unit 370.

For example, a highly reliable electronic device can be realized by applying, for example, the physical quantity sensor 1 of the present embodiment described above as the physical quantity sensor 310.

Various electronic devices are conceivable as such an electronic device 300, and examples include a personal computer (for example, a mobile type personal computer, a laptop type personal computer, a tablet type personal computer), a mobile terminal such as a smart phone and a mobile phone, a digital camera, an inkjet type discharge device (for example, an ink jet printer), a storage area network device such as a router and a switch, a local area network device, a mobile terminal base station device, a television, a video camera, a video recorder, a car navigation device, a real time clock device, a pager, an electronic diary (with a communication function), an electronic dictionary, a calculator, an electronic game machine, a game controller, a word processor, a work station, a videophone, a security TV monitor, electronic binoculars, a POS terminal, medical equipment (for example, an electronic clinical thermometer, a blood pressure monitor, a blood glucose meter, an electrocardiogram measuring device, an ultrasonic diagnostic device, an electronic endoscope), a fish finder, various measuring instruments, meters and gauges (for example, instruments of a vehicle, an aircraft, and a ship), a flight simulator, a head mounted display, a motion trace, a motion tracking, a motion controller, a pedestrian position azimuth measurement (PDR), and the like.

Figure 14:
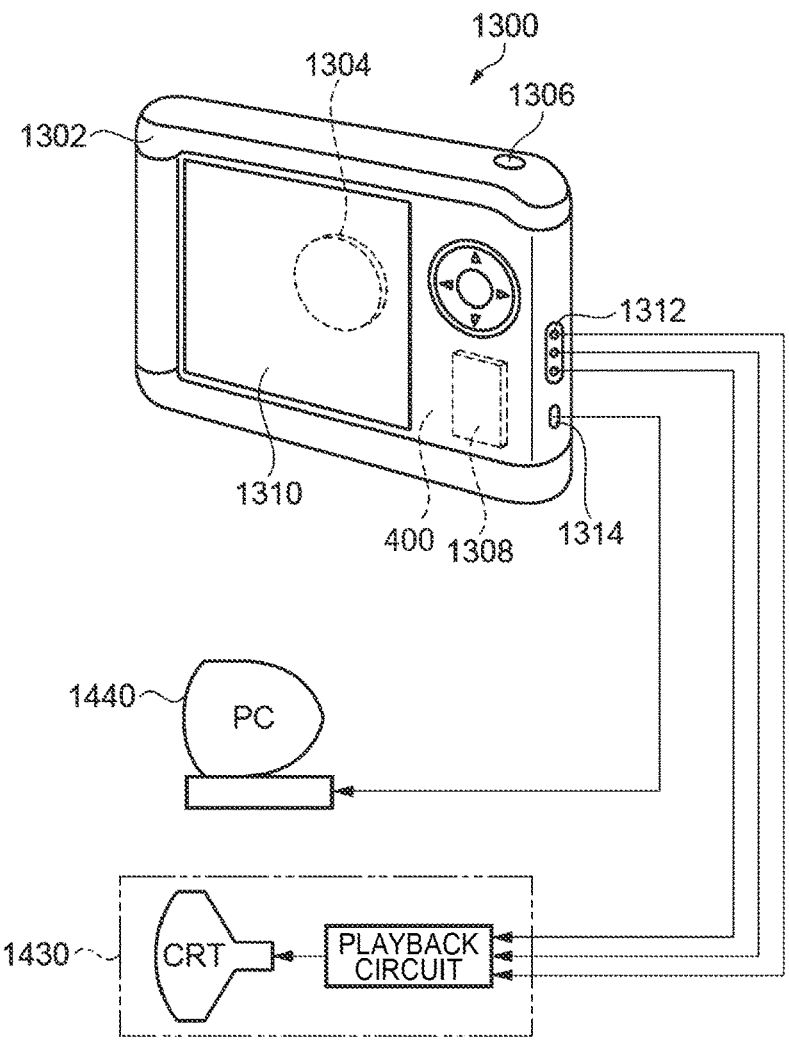
FIG. 14 is a perspective view schematically illustrating a digital camera which is an example of the electronic device.

FIG. 14 is a perspective view schematically illustrating a digital camera 1300 which is an example of the electronic device 300 of the present embodiment. In addition, FIG. 14 also simply illustrates the connection with the external device. Here, a normal camera exposes a silver salt photographic film to an optical image of a subject, whereas a digital camera 1300 photoelectrically converts an optical image of a subject by an imaging element such as a charge coupled device (CCD) to generate an imaging signal (image signal).

A display unit 1310 is provided on the back surface of a case (body) 1302 in the digital camera 1300 and is configured to perform display based on the imaging signal by the CCD, and the display unit 1310 functions as a finder that displays a subject as an electronic image. In addition, a light receiving unit 1304 including an optical lens (imaging optical system), a CCD, or the like is provided on the front side (the back side in FIG. 14) of the case 1302. When the photographer checks the subject image displayed on the display unit 1310 and presses the shutter button 1306, the imaging signal of the CCD at that time is transferred and stored in the memory 1308. Further, in the digital camera 1300, a video signal output terminal 1312 and an input and output terminal 1314 for data communication are provided on the side surface of the case 1302. A TV monitor 1430 is connected to the video signal output terminal 1312, and a personal computer 1440 is connected to the input and output terminal 1314 for data communication, respectively, as necessary. Further, it is configured such that the imaging signal stored in the memory 1308 is output to the TV monitor 1430 or the personal computer 1440 by a predetermined operation. The digital camera 1300 includes a physical quantity sensor 310, and performs processing such as camera shake correction using the output signal of the physical quantity sensor 310, for example.

3. Vehicle

Figure 15:
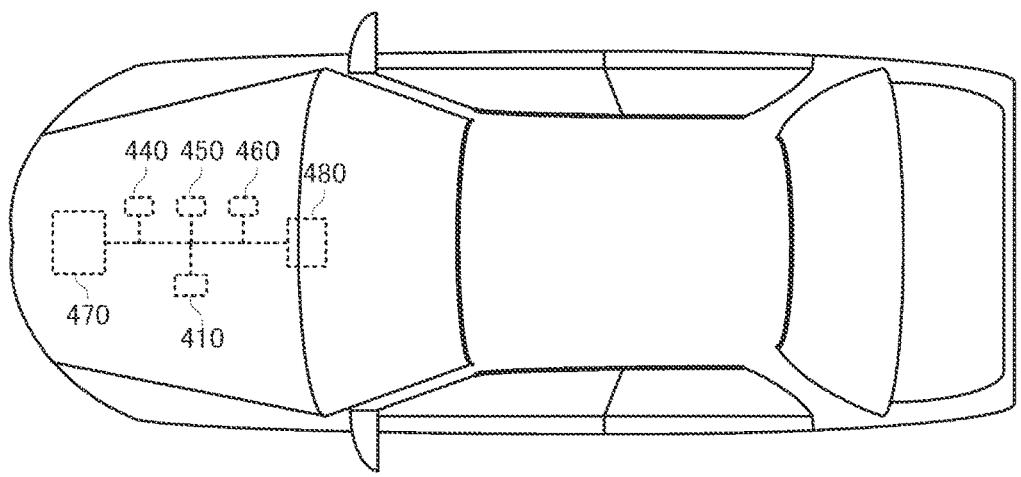
FIG. 15 is a diagram illustrating an example of a vehicle according to the present embodiment.

FIG. 15 is a diagram (top view) illustrating an example of a vehicle according to the present embodiment. The vehicle 400 illustrated in FIG. 15 is configured to include a physical quantity sensor 410, controllers 440, 450, and 460, a battery 470, and a navigation device 480. It is to be noted that the vehicle according to the present embodiment may be configured in such a manner that a part of the constituent elements (respective portions) in FIG. 15 is omitted, or other constituent elements are added.

The physical quantity sensor 410, the controllers 440, 450, and 460, the navigation device 480 operate with the power supply voltage supplied from the battery 470.

The physical quantity sensor 410 detects the physical quantity and outputs the detection result to the controllers 440, 450, and 460.

The controllers 440, 450, and 460 are control devices that perform various controls on an attitude control system, a rollover prevention system, a brake system, and the like, respectively, by using the output signal of the physical quantity sensor 410.

The navigation device 480 displays the position and time of the vehicle 400 and other various types of information on the display, based on the output information of a built-in GPS receiver (not shown). The navigation device 480 specifies the position and orientation of the vehicle 400 based on the output signal of the physical quantity sensor 410 even when the radio wave of the GPS does not reach, and continues to display the necessary information.

For example, a highly reliable vehicle can be realized by applying, for example, the physical quantity sensor 1 of the each of the embodiments described above as the physical quantity sensor 410.

As such a vehicle 400, various vehicles are conceivable, examples of which include an automobile (including an electric car), an aircraft such as a jet aircraft and a helicopter, a ship, a rocket, an artificial satellite, and the like.

Each of the above-described embodiments and modification examples is examples, and the invention is not limited thereto. For example, the respective embodiments and the respective modification examples can be appropriately combined.

Further, the invention includes substantially the same configuration (for example, a configuration having the same function, method, and result, or a configuration having the same purpose and effect) as the configuration described in the embodiment. Further, the invention includes configurations in which the non-essential parts of the configuration described in the embodiment are replaced. Further, the invention includes configurations that achieve the same effect as the configuration described in the embodiment or configurations that can achieve the same object. Further, the invention includes configurations in which a well-known technology is added to the configuration described in the embodiment.

The entire disclosure of Japanese Patent Application No. 2017-057137, filed Mar. 23, 2017 is expressly incorporated by reference herein.

What is claimed is:

1. A sensor element control device connectable to a sensor element including a drive unit and a detection unit, comprising:
 a drive circuit configured to output a drive signal to the drive unit;
 a detection circuit configured to generate a detection signal based on a signal output from the detection unit;
 a diagnostic signal generation circuit configured to (i) calculate a detuning frequency based on a difference between a drive frequency at which the drive unit vibrates and a detection frequency at which the detection unit vibrates and (ii) generate a diagnostic signal at the calculated detuning frequency; and
 a fault diagnosis circuit configured to perform a fault diagnosis based on the signal output from the detection unit when the diagnostic signal is superimposed on the drive signal.

2. The sensor element control device according to claim 1,
 wherein when the diagnostic signal is superimposed on the drive signal, the superimposed drive signal includes an amplitude-modulated drive signal which is amplitude modulated with the detuning frequency.

3. The sensor element control device according to claim 1,
 wherein an amplitude of the diagnostic signal is variable.

4. The sensor element control device according to claim 3,
 wherein the diagnostic signal generation circuit changes the amplitude of the diagnostic signal, based on an amplitude of a signal output from the drive unit.

5. The sensor element control device according to claim 1,
wherein the detection circuit includes a synchronous detection circuit configured to perform synchronous detection on the signal output from the detection unit, and
wherein the fault diagnosis circuit performs the fault diagnosis on an output signal of the synchronous detection circuit, based on a signal subjected to a bandpass filtering process in which the detuning frequency is included in a passband.

6. The sensor element control device according to claim 1, further comprising:
a storage unit configured to store information on the detuning frequency.

7. The sensor element control device according to claim 1,
wherein the fault diagnosis circuit performs the fault diagnosis when the sensor element control device is activated.

8. The sensor element control device according to claim 7,
wherein the fault diagnosis circuit further performs the fault diagnosis at a predetermined timing after activation of the sensor element control device.

9. The sensor element control device according to claim 1,
wherein the fault diagnosis circuit changes a threshold for the fault diagnosis, based on an amplitude of the signal output from the drive unit.

10. The sensor element control device according to claim 1,
wherein the diagnostic signal generation circuit generates a plurality of diagnostic signals having frequency components corresponding to detuning frequencies which are different from each other, and
wherein the fault diagnosis circuit performs the fault diagnosis based on the signal output from the detection unit when each of the plurality of diagnostic signals is superimposed on the drive signal.

11. A physical quantity sensor comprising:
the sensor element control device according to claim 1; and
the sensor element.

12. A physical quantity sensor comprising:
the sensor element control device according to claim 2; and
the sensor element.

13. A physical quantity sensor comprising:
the sensor element control device according to claim 3; and
the sensor element.

14. A physical quantity sensor comprising:
the sensor element control device according to claim 4; and
the sensor element.

15. A physical quantity sensor comprising:
the sensor element control device according to claim 5; and
the sensor element.

16. The physical quantity sensor according to claim 11,
wherein the drive unit of the sensor element is driven to vibrate by the drive signal, and
wherein the detection unit of the sensor element outputs a signal based on a change in the physical quantity.

17. The physical quantity sensor according to claim 11,
wherein the sensor element further includes a plurality of connecting arms connecting the detection unit and the drive unit,
wherein the detection unit includes a detection base portion and a plurality of detection vibrating arms extending from the detection base portion, and
wherein the drive unit includes a plurality of driving base portions connected to the detection base portion by each of the plurality of connecting arms, and a plurality of driving vibrating arms extending from each of the plurality of driving base portions.

18. An electronic device comprising:
the physical quantity sensor according to claim 11.

19. A vehicle comprising:
the physical quantity sensor according to claim 11.

20. A fault diagnosis method for diagnosing a fault of a physical quantity sensor including a sensor element including a drive unit and a detection unit and a sensor element control device controlling the sensor element, the method comprising:
calculating a detuning frequency based on a difference between a drive frequency at which the drive unit vibrates and a detection frequency at which the detection unit vibrates;
generating a diagnostic signal at the calculated detuning frequency;
superimposing the diagnostic signal on a drive signal and outputting the drive signal to the drive unit; and
performing fault diagnosis of the physical quantity sensor, based on a signal output from the detection unit.

* * * * *